US009760262B2

(12) United States Patent
Drucker et al.

(10) Patent No.: US 9,760,262 B2
(45) Date of Patent: Sep. 12, 2017

(54) GESTURES INVOLVING DIRECT INTERACTION WITH A DATA VISUALIZATION

(71) Applicant: Microsoft Corporation, Redmond, WA (US)

(72) Inventors: Steven M. Drucker, Bellevue, WA (US); Danyel A. Fisher, Seattle, WA (US); Ramik Sadana, Atlanta, GA (US); Jessica P. Herron, Providence, RI (US); Monica M. C. Schraefel, Southampton (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/871,199

(22) Filed: Apr. 26, 2013

(65) Prior Publication Data
US 2014/0282276 A1    Sep. 18, 2014

Related U.S. Application Data

(60) Provisional application No. 61/786,412, filed on Mar. 15, 2013.

(51) Int. Cl.
*G06F 3/048* (2013.01)
*G06F 3/0484* (2013.01)
(Continued)

(52) U.S. Cl.
CPC ...... *G06F 3/04845* (2013.01); *G06F 3/04847* (2013.01); *G06F 3/04883* (2013.01); *G06F 17/245* (2013.01)

(58) Field of Classification Search
CPC ............ G06F 3/04845; G06F 3/04847; G06F 3/04883; G06F 17/245
See application file for complete search history.

(56) References Cited

U.S. PATENT DOCUMENTS 7,840,600 B1 *  11/2010  Bhatia ............... G06F 17/30398
                                                        707/783
8,527,909 B1 *   9/2013  Mullany ............... G06F 3/0484
                                                          345/173

(Continued)

OTHER PUBLICATIONS

Herron, Jessica, "User Experience Design," retrieved at <<http://www.jessicaherron.com/postgrad/UX_portfolio_touchviz_2012.pdf>>, retrieved on Feb. 19, 2013, 8 pages.

(Continued)

*Primary Examiner* — Liliana Cerullo
(74) *Attorney, Agent, or Firm* — Rainier Patents, P.S.

(57) ABSTRACT

Functionality is described herein for directly interacting with parts of a data visualization. For instance, the functionality allows a user to directly interact with data items to filter them out from the data visualization, and later restore them to the data visualization. The functionality also allows a user to directly interact with an axis to sort the data items in the data visualization. The functionality also allows a user to directly interact with a label of the data visualization to choose a new label, and to reorganize the information represented by the data visualization in response thereto. Further, before finalizing any update to the data visualization, the functionality may provide a preview of the updated data visualization.

20 Claims, 14 Drawing Sheets

(51) Int. Cl.
G06F 3/0488 (2013.01)
G06F 17/24 (2006.01)

(56) References Cited

U.S. PATENT DOCUMENTS

| | | | | |
|---|---|---|---|---|
| 2004/0174397 | A1* | 9/2004 | Cereghini et al. | 345/855 |
| 2008/0192056 | A1* | 8/2008 | Robertson | G06T 13/80 345/440 |
| 2010/0251151 | A1* | 9/2010 | Alsbury | G06F 1/1626 715/765 |
| 2011/0055773 | A1* | 3/2011 | Agarawala et al. | 715/863 |
| 2011/0115814 | A1* | 5/2011 | Heimendinger et al. | 345/619 |
| 2011/0141031 | A1* | 6/2011 | McCullough | G06F 3/0481 345/173 |
| 2011/0163968 | A1* | 7/2011 | Hogan | 345/173 |
| 2011/0164055 | A1 | 7/2011 | McCullough et al. | |
| 2011/0197153 | A1* | 8/2011 | King et al. | 715/769 |
| 2012/0030566 | A1* | 2/2012 | Victor | 715/702 |
| 2012/0036485 | A1* | 2/2012 | Watkins, Jr. | G06F 1/1626 715/863 |
| 2012/0162265 | A1* | 6/2012 | Heinrich et al. | 345/661 |
| 2012/0166470 | A1* | 6/2012 | Baumgaertel | G06F 17/30554 707/769 |
| 2012/0180002 | A1* | 7/2012 | Campbell et al. | 715/863 |
| 2012/0200513 | A1* | 8/2012 | Kim | G06F 1/1626 345/173 |
| 2012/0229468 | A1* | 9/2012 | Lee | G06F 9/4443 345/440 |
| 2012/0235938 | A1 | 9/2012 | Laubach | |
| 2012/0324388 | A1* | 12/2012 | Rao | G06F 3/048 715/771 |
| 2013/0014053 | A1* | 1/2013 | Cabrera-Cordon et al. | 715/810 |
| 2013/0061176 | A1* | 3/2013 | Takehiro | G06F 3/0488 715/823 |
| 2013/0117651 | A1* | 5/2013 | Waldman | G06F 9/44526 715/220 |
| 2013/0298085 | A1 | 11/2013 | Kritt et al. | |
| 2013/0339399 | A1* | 12/2013 | Dorris et al. | 707/803 |
| 2014/0149947 | A1* | 5/2014 | Blyumen | 715/863 |

OTHER PUBLICATIONS

Sanfilippo, et al., "InfoStar: An Adaptive Visual Analytics Platform for Mobile Devices," retrieved at <<http://ieeexplore.ieee.org/stamp/stamp.jsp?tp=&arnumber=1560026>>, Proceedings of the 2005 ACM/IEEE Conference on Supercomputing, 2005, 10 pages.
Walny, et al., "Understanding Pen and Touch Interaction for Data Exploration on Interactive Whiteboards," retrieved at <<http://research.microsoft.com/en-us/um/redmond/groups/cue/publications/TVCG2012-SketchInsight.pdf>>, IEEE Transactions on Visualization and Computer Graphics , Dec. 2012, 10 pages.
"Core Area: Natural User Interactions," retrieved at <<http://vis.pnnl.gov/core_nui.stm>>, Pacific Northwest National Library, Feb. 2013, 2 pages.
Amar, et al., "Low-Level Components of Analytic Activity in Information Visualization," retrieved at <<http://ieeexplore.ieee.org/stamp/stamp.jsp?tp=8,arnumber=1532136>>, Proceeding of IEEE Symposium on Information Visualization, Oct. 23, 2005, 7 pages.
Bau, et al., "OctoPocus: A Dynamic Guide for Learning Gesture-Based Command Sets," retrieved at <<http://acm.org>>, Proceedings of the 21st Annual ACM Symposium on User Interface Software and Technology, pp. 37-46.
Bostock, et al., "D³: Data-Driven Documents," retrieved at <<http://ieeexplore.ieee.org/stamp/stamp.jsp?tp=&arnumber=6064996>>, IEEE Transactions on Visualization and Computer Graphics, vol. 17, No. 12, Dec. 2011, pp. 2301-2309.
Browne, et al., "Data Analysis on Interactive Whiteboards through Sketch-based Interaction," retrieved at <<http://research.microsoft.com/en-us/um/people/nath/docs/isketchvis_its2011.pdf>>, Proceedings of the ACM International Conference on Interactive Tabletops and Surfaces, Nov. 2011, pp. 154-157.
Forlines, et al., "Direct-Touch vs. Mouse Input for Tabletop Displays," retrieved at <<http://acm.orgf>>, Proceedings of the SIGCHI Conference on Human Factors in Computing Systems, Apr. 2007, pp. 647-656.
Grammel, et al., "How Information Visualization Novices Construct Visualizations," retrieved at <<http://ieeexplore.ieee.org/stamp/stamp.jsp?tp=&arnumber=5613431>>, IEEE Transactions on Visualization and Computer Graphics, vol. 16, No. 6, Nov. 2010, pp. 943-952.
Guimbretiere, et al., "Benefits of Merging Command Selection and Direct Manipulation," retrieved at <<http://acm.org>>, Journal of ACM Transactions on Computer-Human Interaction, vol. 12, Issue 3, Sep. 2005, pp. 460-476.
Heer, et al., "Animated Transitions in Statistical Data Graphics," retrieved at <<http://ieeexplore.ieee.org/stamp/stamp.jsp?tp=&arnumber=4376146>>, IEEE Transactions on Visualization and Computer Graphics, vol. 13, No. 6, Nov. 2007, pp. 1240-1247.
Hutchins, et al., "Direct Manipulation Interfaces," retrieved at <<http://acm.org>>, Human-Computer Interaction, vol. 1, Issue 4, Dec. 1985, pp. 311-338.
Heer, et al., "Interactive Dynamics for Visual Analysis," retrieved at <<http://acm.org>>, Queue, vol. 10, Issue 2, Feb. 2012, 26 pages.
Kolb, et al., "Towards Gesture-based Process Modeling on Multi-Touch Devices," retrieved at <<http://dbis.eprints.uni-ulm.de/799/1/Kolb_HC-PAIS_2012a.pdf>>, Lecture Notes in Business Information Processing, vol. 112, Workshops of Advanced Information Systems Engineering, Jun. 25, 2012, 14 pages.
Morris, et al., "Understanding Users' Preferences for Surface Gestures," retrieved at <<http://acm.org>>, Proceedings of Graphics Interface Conference, May 31, 2010, pp. 261-268.
Nielsen, Jakob, "Jakob Nielsen's Alertbox: Browser and GUI Chrome," retrieved at <<http://www.nngroup.com/articles/browser-and-gui-chrome/>>, Nielsen Norman Group, Jan. 30, 2012, 3 pages.
North, et al., "Understanding Multi-touch Manipulation for Surface Computing," retrieved at <<http://infovis.cs.vt.edu/sites/default/files/fulltext.pdf>>, Proceedings of the 12th IFIP TC 13 International Conference on Human-Computer Interaction, Aug. 24, 2009, 14 pages.
Shneiderman, Ben, "Direct Manipulation: A Step Beyond Programming Languages," retrieved at <<http://ieeexplore.ieee.org/stamp/stamp.jsp?tp=&arnumber=1654471>>, Journal of Human Factors in Interactive Computer Systems, vol. 16, Issue 8, Aug. 1983, 13 pages.
Stolte, et al., "Polaris: A System for Query, Analysis, and Visualization of Multidimensional Relational Databases," retrieved at <<http://ieeexplore.ieee.org/stamp/stamp.jsp?tp=&arnumber=981851>>, IEEE Transactions on Visualization and Computer Graphics, vol. 8, No. 1, Jan. 2002, pp. 52-65.
Wickham, Hadley, "ggplot2," retrieved at <<http://ggplot2.org/>>, retrieved on Feb. 20, 2013, 1 page.
Wobbrock, et al., "User-Defined Gestures for Surface Computing," retrieved at <<http://acm.org>>, Proceedings of the SIGCHI Conference on Human Factors in Computing Systems, Apr. 4, 2009, pp. 1083-1092.
Baudel, et al., "From Information Visualization to Direct Manipulation: Extending a Generic Visualization Framework for the Interactive Editing of Large Datasets," retrieved at <<http://acm.org>>, Proceedings of the 19th Annual ACM Symposium on User Interface Software and Technology, 2006, pp. 67-76.
Yee, Wendy, "Potential Limitations of Multi-touch Gesture Vocabulary: Differentiation, Adoption, Fatigue," retrieved at <<http://link.springer.com/chapter/10.1007%2F978-3-642-02577-8_32>>, Proceedings of the 13th International Conference on Human-Computer Interaction. Part II: Novel Interaction Methods and Techniques, Springer-Verlag Berlin, Heidelberg, 2009, pp. 291-300.
Wigdor, et al., "Brave NUI World: Designing Natural User Interfaces for Touch and Gesture," retrieved at <<http://amazon.com>>, retrieved on Apr. 26, 2013, Amazon.com product description only, Morgan Kaufmann, Boston, 2011, 6 pages.
Wigdor, et al., "Brave NUI World: Designing Natural User Interfaces for Touch and Gesture," retrieved at <<http://www.

(56) References Cited

OTHER PUBLICATIONS sciencedirect.com/science/article/pii/B9780123822314000393>>, Morgan Kaufmann, Boston, 2011, index only, pp. 229-242.

Wickham, et al., "ggplot2: An implementation of the Grammar of Graphics," retrieved at <<http://cran.r-project.org/web/packages/ggplot2/index.html>>, Mar. 2, 2013, 2 pages.

Drucker et al., "TouchViz: A Case Study Comparing Two Interfaces for Data Analytics on Tablets", CHI 2013, Proceedings of the SIGCHI Conference on Human Factors in Computing Systems, pp. 2301-2310, Apr. 27-May 2, 2013, Paris, France, 10 Pages.

* cited by examiner

GESTURES INVOLVING DIRECT INTERACTION WITH A DATA VISUALIZATION

This application claims the benefit of U.S. Provisional Application No. 61/786,412 (the '412 Application), filed Mar. 15, 2013. The '412 Application is incorporated by reference herein in its entirety.

BACKGROUND

A data manipulation tool can provide one or more auxiliary control mechanisms that allow a user to manipulate a data visualization, such as a chart, table, graph, etc. For example, the tool may provide various control panels, menus, icons, toolbars, pointers, etc. The tool typically provides these mechanisms within the peripheral regions of a graphical user interface presentation. In practice, a user may interact with the data visualization by making changes to the auxiliary control mechanisms and then observing the resultant changes to the data visualization.

Auxiliary control mechanisms have proven effective in desktop environments. As a result, many users have become competent in using these types of control mechanisms. These control mechanisms, however, are not well suited for some devices. For example, small-sized devices (such as tablet devices, smartphones, etc.) have limited screen "real estate" on which to display the auxiliary control mechanisms.

SUMMARY

Functionality is described herein for allowing a user to directly interact with the parts of a data visualization using various gestures, rather than, or in addition to, interacting with auxiliary control mechanisms. Such parts include individual data items, groups of data items, axes, labels, and so on. In one implementation, the user may directly interact with the parts of the data visualization via a touch-sensitive surface of a computing device.

For instance, the functionality allows a user to interact directly with data items to filter them out from the data visualization. Once filtered out, the functionality may represent the removed data items as placeholder items. The functionality also allows a user to restore filtered out data items to the data visualization. The functionality also allows a user to interact directly with an axis of the data visualization to sort the data items in the data visualization. The functionality also allows a user to interact directly with a label of the data visualization to choose a new label; the functionality responds to such a gesture by pivoting to an updated data visualization based on the new label.

According to another illustrative aspect, the gesture may include two phases. In a first phase, a user may select a part of the data visualization. In a second phase, the user may specify an action, from among a plurality of possible actions, to be performed on the selected part. The first phase and the second phase make up a unified gesture. For example, in a filter-out gesture, the user can select a part by touching one or more data items. The user can specify an action by flicking up or down on the selected data item(s). Flicking up prompts the functionality to perform a first filtering action, while flicking down prompts the functionality to perform a second filtering action.

According to another illustrative aspect, the functionality provides a preview of an updated data visualization before a user completes a gesture. The functionality finalizes the updated data visualization when the user completes the gesture, e.g., when the user removes his or her finger from a display surface of a computing device which provides the data visualization.

The functionality provides various potential benefits. For example, the functionality makes efficient use of screen real estate because it eliminates, or reduces reliance on, auxiliary control mechanisms. This aspect, in turn, makes the functionality particularly appropriate for use in small-sized computing devices having limited screen "real estate," although the functionality can be used in computing devices of any size. In addition, the functionality provides an easy-to-understand approach to interacting with a data visualization. These potential advantages are cited by way of illustration, not limitation.

The above approach can be manifested in various types of systems, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for allowing a user to directly interact with parts of a data visualization. Section B sets forth illustrative methods which explain the operation of the functionality of Section A. Section C describes illustrative computing functionality that can be used to implement any aspect of the features described in Sections A and B.

Figure 21:
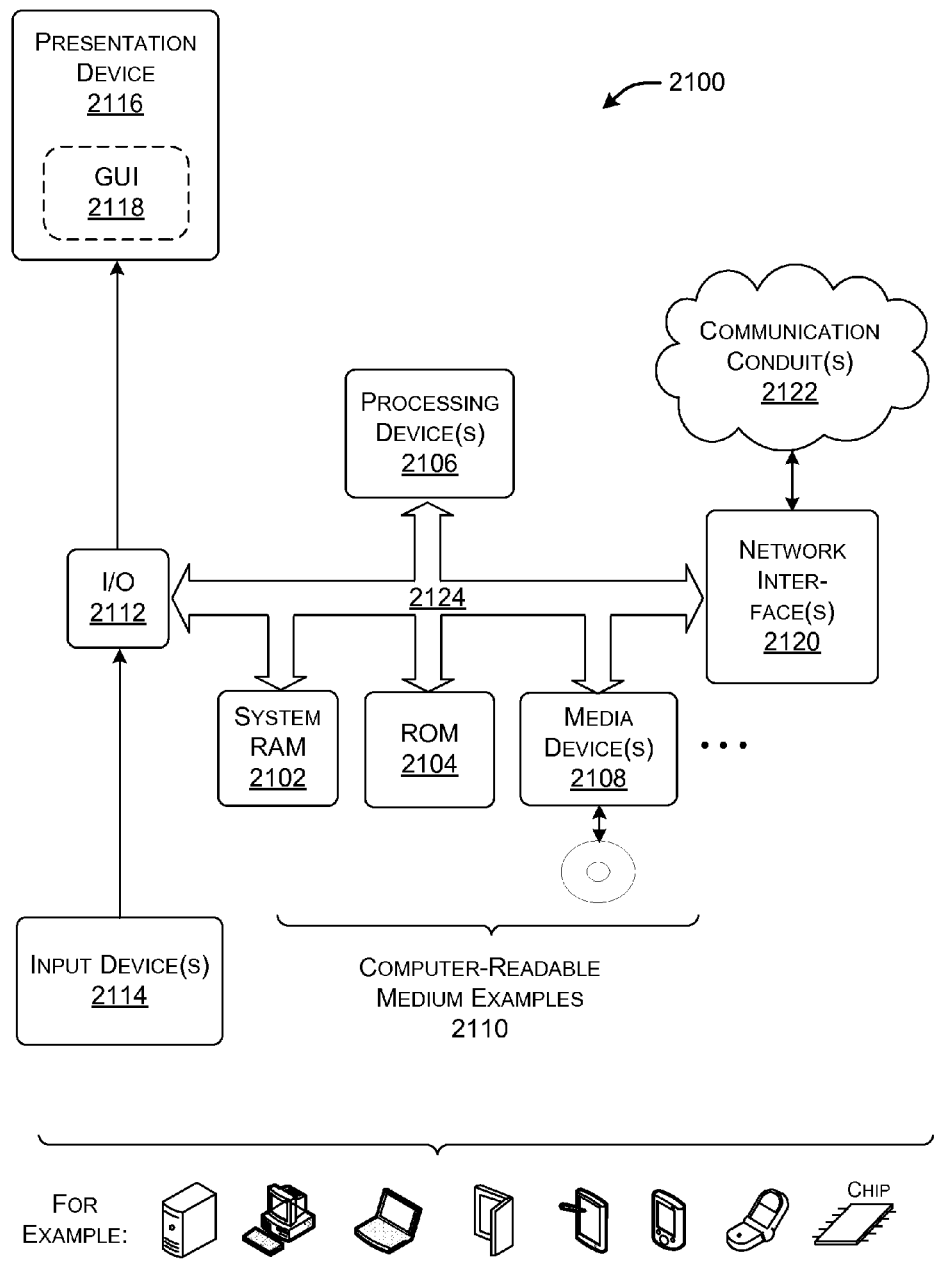
FIG. 21 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 21, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Computing Device

Figure 1:
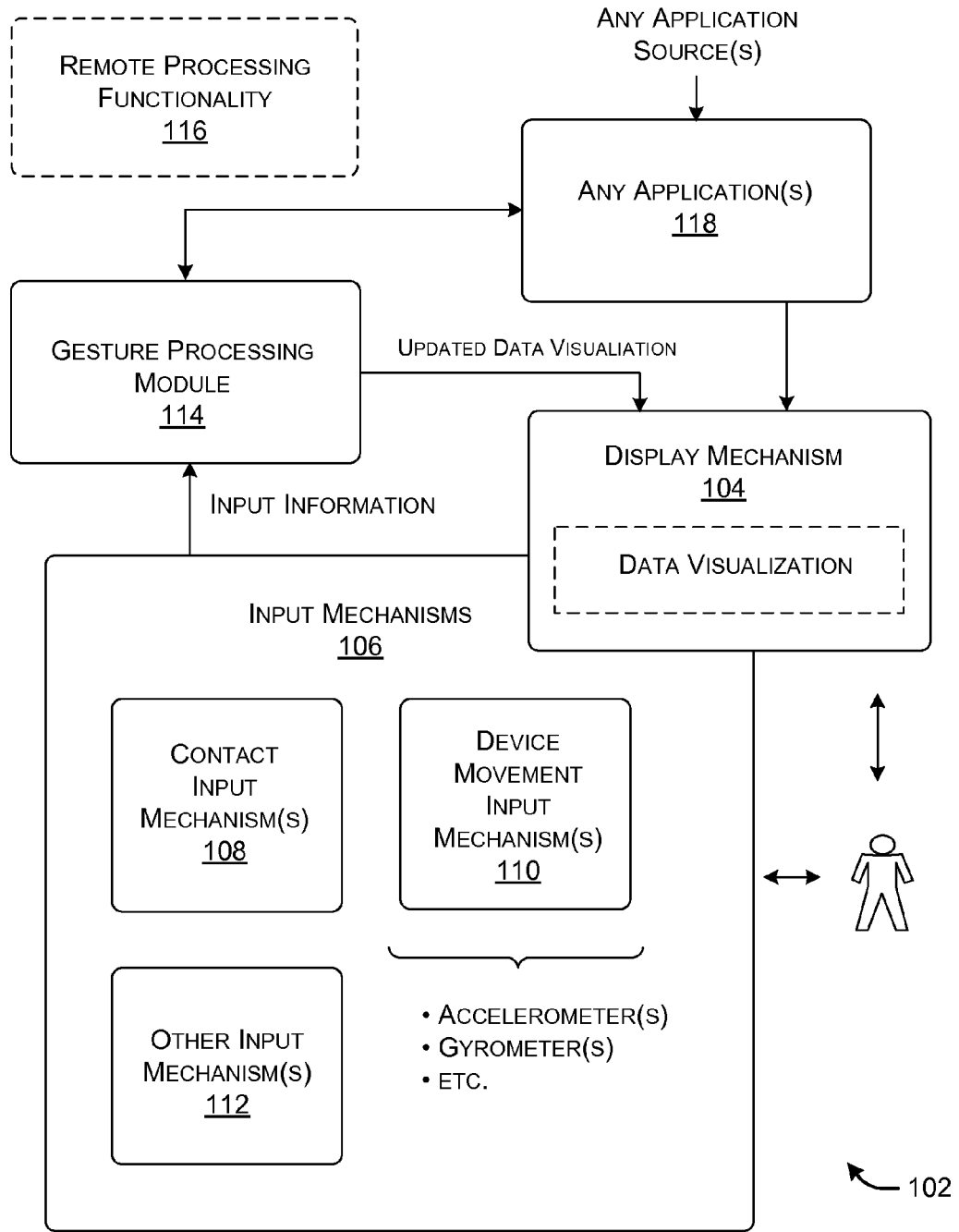
FIG. 1 shows an illustrative computing device that includes functionality for allowing a user to directly interact with parts of a data visualization.

FIG. 1 shows an illustrative computing device 102 that allows a user to directly interact with a data visualization using a set of direct-interaction gestures. As the term is used herein, a data visualization refers to any visual representation of data. The data visualization uses an abstraction to organize and represent the data. Without limitation, illustrative data visualizations include charts (e.g., bar charts, scatter plots, pie charts, etc.), graphs, tables, hyper-cubes (e.g., OLAP cubes), maps, trees, etc.

The data can be expressed as a plurality of data items. A data item, in turn, includes any unit of data. In one case, a data item may correspond to a single measurement or data point. For example, a data item may correspond to a representation of a single event which occurs at a particular time. In another case, a data item may correspond to a grouping or aggregation of other data items. For example, a data item may correspond to an indication of a number of events which occur within a particular time span.

Different data visualizations may be characterized by different graphical features. The computing device 102 may allow a user to interact any graphical features of the data visualization. For example, without limitation, the user may interact with any individual data item, a group of data items, an axis, a label, and so on. By virtue of this mode of interaction, the computing device 102 imparts metaphorical physicality to the parts of the data visualization. And as such, in many cases, the users may directly operate on the parts of the data visualization as if these parts constituted physical entities.

The computing device 102 allows a user to interact with a data visualization using any kind of gesture or combination of gestures. In a device-type gesture, the user can use a mouse device, trackball device, keypad device, etc. to interact with the computing device 102. In a contact gesture, the user can use any type of selection implement (e.g., a finger, stylus, etc.) to interact with one or more touch-sensitive surfaces of the computing device 102 in a prescribed manner, such as by performing dragging, sliding, swiping, flicking, tapping, pressing-and-holding, pinching, panning, etc. actions. In a device movement gesture, the user may move the computing device 102 itself to match a prescribed motion profile, such as by performing tilting, shaking, rotating, etc. movements. Alternatively, or in addition, the user may perform a device movement gesture by moving the computing device 102 to a prescribed static orientation. In a free space expressive gesture, the user may perform any free space motion, and/or establish any free-space posture, without necessarily contacting the computing device 102; the computing device 102 may detect a free space gesture using one or more types of cameras. These types of gestures are cited by way of example, not limitation. Alternatively, or in addition, a user may interact with the data visualization using other input mechanisms, such as by speaking various commands which directly target parts of the data visualization. A voice recognition input mechanism can detect those commands.

More generally stated, the gestures are preferably selected to further promote the metaphor of direction interaction with physical entities. For example, as will be described in greater detail below, a user may perform a filter-out gesture by directly touching a data item and sweeping it out of the original data visualization. This type of interaction is easy for the user to comprehend, in part, because it is related to the manner in which a user may choose to remove a physical object from a collection of physical objects. In other words, the user is not expected to learn an association between an arbitrary symbol and the filtering-out behavior in order to perform the filtering-out behavior.

According to another illustrative aspect, the gesture may include two phases. In a first phase, a user may select a part of the data visualization. In a second phase, the user may specify an action, from among a plurality of possible actions, to be performed on the selected part. The first phase and the second phase make up a unified gesture In practice, the user may interact with the computing device 102 by first ensuring that the data visualization currently includes the graphical feature(s) with which he or she wishes to interact. That is, the corollary of direction interaction paradigm implies that, in one implementation, a user cannot interact with a graphical feature if it is not displayed. Once a desired graphical feature is displayed, the user may use one or more of the above-described gestures to interact with it.

For some data manipulations, the above-described direct manner of interaction involves fewer actions compared to the use of an auxiliary control mechanism to perform the same task. But in other cases, the direct manner operation may involve the same number of actions, or a great number of actions, compared to the use of an auxiliary control mechanism. Nevertheless, the user may prefer the direct manner of interaction (compared to the use of auxiliary control mechanisms) because he or she perceives it as offering a more satisfactory user experience, e.g., because it is easy to understand and user-friendly. Further, the computing device 102 can make more efficient use of screen "real estate" because it can eliminate the use of auxiliary control mechanisms, which typically occupy the peripheral regions of a graphical user interface presentation. In other implementations, however, the computing device 102 may offer a combination of direct manipulation functionality and auxiliary control mechanisms.

With the above introduction, this section first sets forth illustrative details regarding one illustrative implementation of the computing device 102. This section then provides examples of gestures with which a user may interact with the computing device 102.

The computing device 102 may correspond to any type of processing functionality. For example, the computing device 102 may be implemented as a portable device that the user can hold with one or more hands. For instance, without limitation, the computing device 102 can correspond to a smartphone, a media consumption device (e.g., an electronic book reader device, a music-playing device, etc.), a portable digital assistant device, a tablet-type or slate-type computing device, a portable game-playing device, a laptop computing device, a netbook-type computing device, and so on. In other cases, the illustrative computing device 102 corresponds to a (typically) stationary device, such as a personal computer, a computer workstation, a game console device, a set-top box device, and so on.

The computing device 102 includes a display mechanism 104 that provides a visual rendering of information on one or more display surfaces. The display mechanism 104 can be implemented by any type of display technology, such as a liquid crystal display (LCD), a stereoscopic display of any type, a projector which displays information on any surface (e.g., a wall, a tabletop, etc.), and so on. Although not shown, the computing device 102 can also include other types of output mechanisms, such as an audio output mechanism, a haptic (e.g., vibratory) output mechanism, a printer mechanism, etc.

The computing device 102 also includes various input mechanisms 106 by which a user may interact with the computing device 102, e.g., to provide the above-described direct-interaction gestures. According to the terminology used herein, each input mechanism provides input information. An instance of input information can describe any input event(s) having any duration(s) and any composition.

The input mechanisms 106 can include one or more contact input mechanisms 108 which produce contact input information when the user interacts with at least one surface associated with the computing device 102. For example, in one case, a contact input mechanism may be implemented as a touch-sensitive display surface of the computing device 102. In addition, or alternatively, a contact input mechanism may be implemented as a non-display surface, e.g., as provided on the back of the computing device 102, the side(s) of the computing device 102, and so on. In some implementations, a contact input mechanism can also determine when the user comes in close contact with the touch-sensitive surface(s), but does not make physical contact with the touch-sensitive surface(s). Accordingly, as used herein, the term "touch" and "contact" encompass the cases in which the user makes physical contact with a surface, as well as cases in which the user draws in close proximal distance to a surface without actually making physical contact with it.

The contact input mechanisms 108 can be implemented using any technology, such as resistive touch screen technology, capacitive touch screen technology, acoustic touch screen technology, bi-directional touch screen technology, and so on, or any combination thereof. In bi-directional touch screen technology, a display mechanism provides elements devoted to displaying information and elements devoted to receiving information. Bi-directional screen technology is one mechanism by which the contact input mechanisms 108 can detect when the user moves close to a touch-sensitive surface, without actually touching it.

To facilitate explanation, this description will present a number of examples in which the user uses his or her fingers to interact with the contact input mechanisms 108. But, more generally, the user can interact with the contact input mechanisms 108 using any selection implement, including any body part(s), a stylus, a pen, etc. Further, at any given time, the user can interact with the contact input mechanisms 108 using a single-touch (e.g., using a single finger) or multiple touches (e.g., using multiple fingers).

The input mechanisms 106 also include one or more device movement input mechanisms 110 for supplying movement input information that describes the movement of the computing device 102. That is, the device movement input mechanisms 110 correspond to any input mechanisms that measure the orientation and/or motion of the computing device 102. For instance, the device movement input mechanisms 110 can be implemented using accelerometers, gyroscopes, magnetometers, vibratory sensors, torque sensors, strain gauges, flex sensors, optical encoder mechanisms, and so on, or any combination thereof.

FIG. 1 also indicates that the input mechanisms 106 can include any other input mechanisms 112. For example, the other input mechanisms 112 can include one or more video cameras for producing video input information. In addition, or alternatively, the other input mechanisms 112 can include one or more depth sensing mechanisms for producing and processing depth input information. A depth sensing mechanism can use any depth-sensing technology to determine the position of the user (and/or any implement controlled by the user) within three dimensional space, such as structured light depth-sensing technology, time-of-flight depth-sensing technology, stereoscopic depth-sensing technology, and so on. Through this mechanism, the computing device 102 can determine gestures that the user makes within free space, e.g., by making the gestures in front of a wall-projected data visualization without physically touching that data visualization. One commercially-available system for producing and processing depth images is the Kinect™ system, provided by Microsoft® Corporation of Redmond, Wash. The other input mechanisms 112 can also include any collection of traditional input devices, such as a mouse device, a track ball device, a joystick device, a keyboard device, a voice recognition mechanism, etc. or any combination thereof.

Note that FIG. 1 depicts the display mechanism 104 as partially overlapping the input mechanisms 106. This relationship means that, in some implementations, the display mechanism 104 may be physically integrated with at least some of the input mechanisms 106. For example, a touch-sensitive display surface encompasses both an input mechanism and an output mechanism. In other cases, the display mechanism 104 is separate and independent from at least some of the input mechanisms 106.

Further note that, in some cases, the input mechanisms 106 may represent components that are enclosed in or disposed on a housing associated with the computing device 102. In other cases, at least some of the input mechanisms 106 may represent functionality that is not physically integrated with the housing associated with the computing device 102, but nonetheless may be considered as part of the computing device 102 (as the term is used herein). For example, at least some of the input mechanisms 106 can represent components that are coupled to a main body of the computing device 102 via a communication mechanism of any type, e.g., a cable, wireless interface, etc. For instance, one type of contact input mechanism may correspond to a graphics tablet that is separate from (or at least partially separate from) the display mechanism 104.

Likewise, the display mechanism 104 may represent a component which is physically integrated with the housing associated with the computing device 102. Alternatively, the display mechanism 104 may represent functionality that is not physically integrated with the housing, but nonetheless may be considered as part of the computing device 102.

Figure 2:
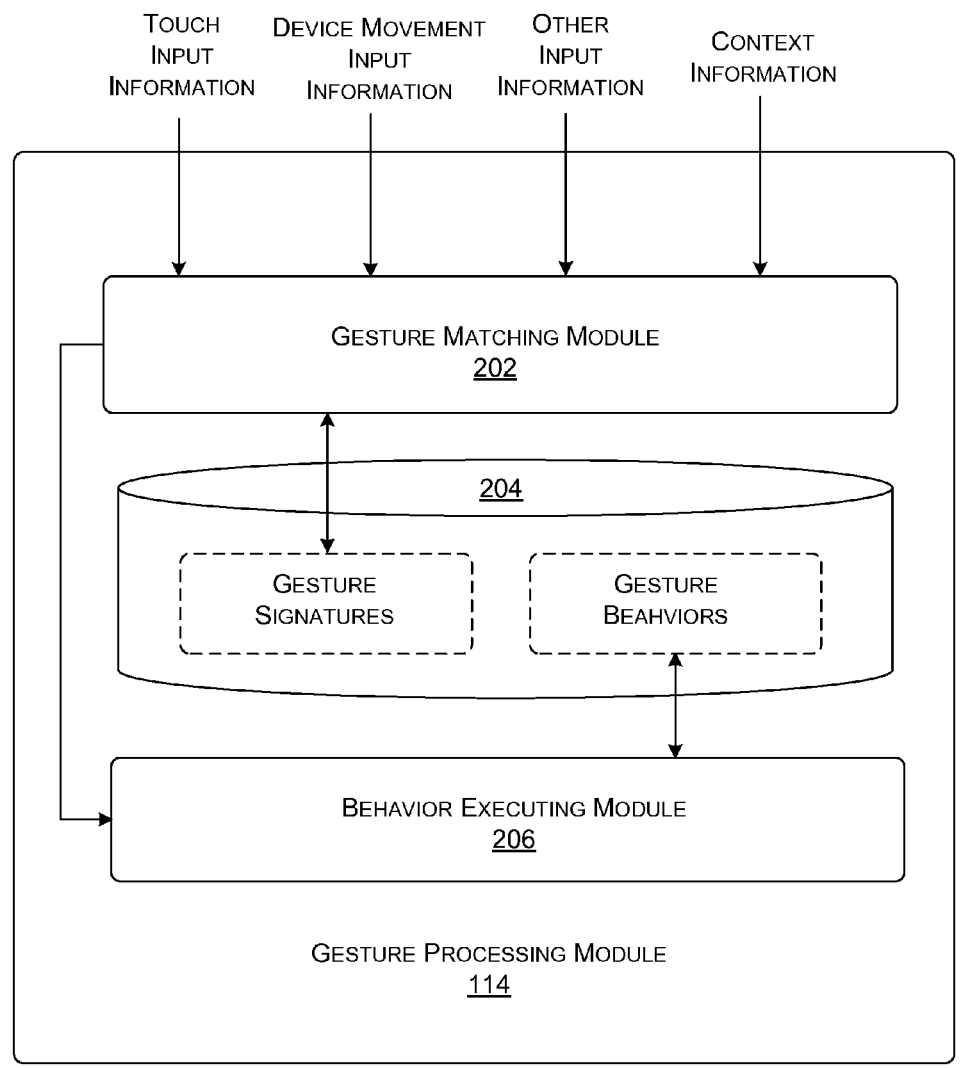
FIG. 2 shows one implementation of a gesture processing module, which is a component of the computing device of FIG. 1.

A gesture processing module 114 performs the task of interpreting the input information provided by the input mechanisms 106. In particular, the gesture processing module 114 determines whether the user has made a recognizable gesture that involves directly interacting with a data visualization (to be described below), referred to herein as a direct-interaction gesture. If this kind of gesture is detected, the gesture processing module 114 executes behavior associated with that gesture. FIG. 2 (described below) provides additional details regarding one implementation of the gesture processing module 114.

The computing device 102, as this term is used herein, may also encompass remote processing functionality 116. The remote processing functionality 116 may be implemented using one or more remote severs and associated data stores, e.g., as provided by cloud computing resources or the like.

The computing device 102 may also run one or more applications 118. An application can perform any functions associated with any application domain. In some cases, the computing device 102 executes the applications 118 using local resources, such as local storage resources and local processing resources. In other cases, the computing device 102 executes an application by also relying, at least in part, on resources provided by the remote processing functionality 116.

As a final point of clarification with respect to FIG. 1, this figure depicts the gesture processing module 114 as a self-contained module that is separate from the remote processing functionality 116 and the applications 118. Indeed, in some cases, the gesture processing module 114 may represent a separate and self-contained module that both recognizes a gesture and performs whatever behavior is associated with the gesture. In another case, one or more functions attributed to the gesture processing module 114 can be performed by the remote processing functionality 116 and/or the any of the applications 118. For example, in one implementation, the gesture processing module 114 can interpret a gesture that has been performed, while one of the applications 118 can select and execute behavior associated with the detected gesture. Accordingly, the gesture processing module 114 is to be interpreted liberally herein as encompassing functionality that may be distributed among different components of the computing device 102 in any manner.

FIG. 2 shows one implementation of the gesture processing module 114. The gesture processing module 114 can include a gesture matching module 202 for receiving input information. The input information can include contact input information from the contact input mechanisms 108 (corresponding to touch input, pen input, etc.), device movement input information from the device movement input mechanisms 110, and any other input information from any other input mechanisms 112, etc. The input information can also include context information which identifies a context in which a user is currently using the computing device 102. For example, the context information can identify the application that the user is running at the present time, and optionally the current state within that application. Alternatively, or in addition, the context information can describe the physical environment in which the user is using the computing device 102, and so on.

In one manner of operation, the gesture matching module 202 compares the input information with a collection of signatures that describe different telltale ways that a user may directly interact with the data visualization. A data store 204 may store those signatures, e.g., as a lookup table, as the parameters of a model, or in some other manner. For example, a signature may indicate that a direct-interaction gesture X is characterized by a pattern of touch-related input events A, B, and C. The gesture matching module 202 determines that a particular instance of input information matches the gesture X by determining whether the input information includes input events A, B, and C.

A behavior executing module 206 executes whatever behavior is associated with a matching gesture. The data store 204 may store information regarding the actions that are associated with each detectable gesture, e.g., as a lookup table or using some other mechanism. The behavior executing module 206 can execute a gesture by consulting the data store 204 to determine what actions are associated with a particular gesture that has been detected. The behavior executing module 206 can then perform those actions.

FIGS. 3-15 depict scenarios in which a user uses various gestures to interact with a data visualization. In these particular scenarios, the data visualization corresponds to a bar chart. The parts of this data visualization, with which the user may interact, include data items, groups of data items, axes, labels, icons, and so on. For example, each bar in the bar chart may correspond to a data item. Note, however, that these scenarios are presented by way of illustration, not limitation. In other scenarios, the user may use the computing device 102 to interact with other types of data visualizations (such as graphs, tables, maps, trees, etc.). Each of those data visualizations may be characterized by a set of graphical features with which the user may directly interact, and those graphical features may differ from the features shown in FIGS. 3-15.

Figure 3:
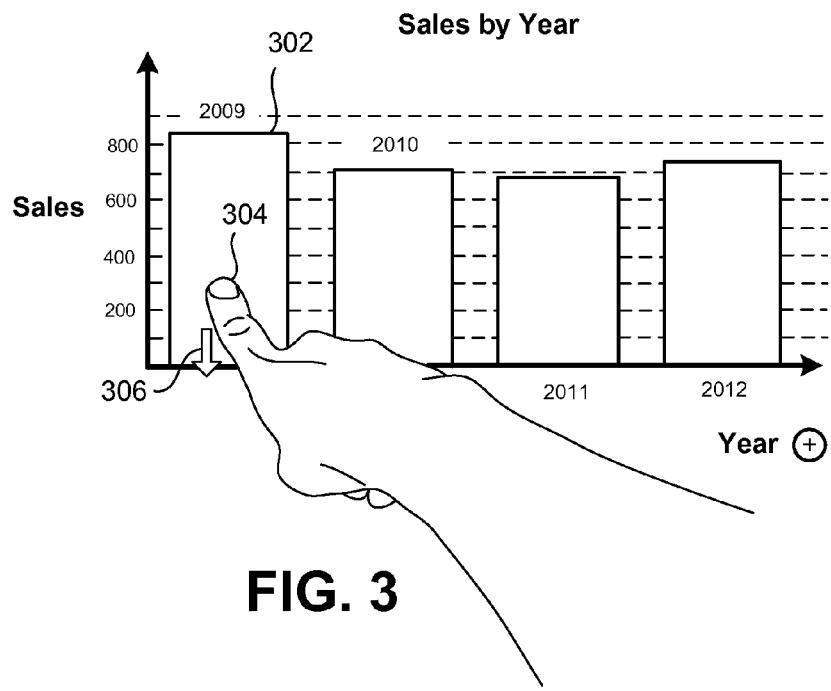
FIGS. 3 and 4 show an illustrative filter-out gesture, and the computing device's response to that gesture.

Starting with FIG. 3, assume that the user instructs the computing device 102 to display an original data visualization, corresponding to a bar chart that describes sales volume for four years: 2009, 2010, 2011, and 2012. Each of the bars corresponds to a data item. The user begins by using a filter-out gesture to filter out one of the data items, such as the data item 302 that corresponds to the sales volume for the year 2009. In one implementation, the user may perform the filter-out gesture by touching the data item 302 with his or her finger 304 (or any other selection implement) and moving his or her finger 304 in a prescribed manner. For example, the user may move his or her finger 304 in downward direction 306, e.g., flicking his or her finger 304 in the downward direction 306. In one non-limiting implementation, the computing device 102 may interpret the downward movement as an instruction to remove the selected data item 302 from the original data visualization. The computing device 102 may interpret an upward movement (not shown) as an instruction that all of the other data items in the original data visualization are to be removed, except for the selected data item 302.

Figure 4:
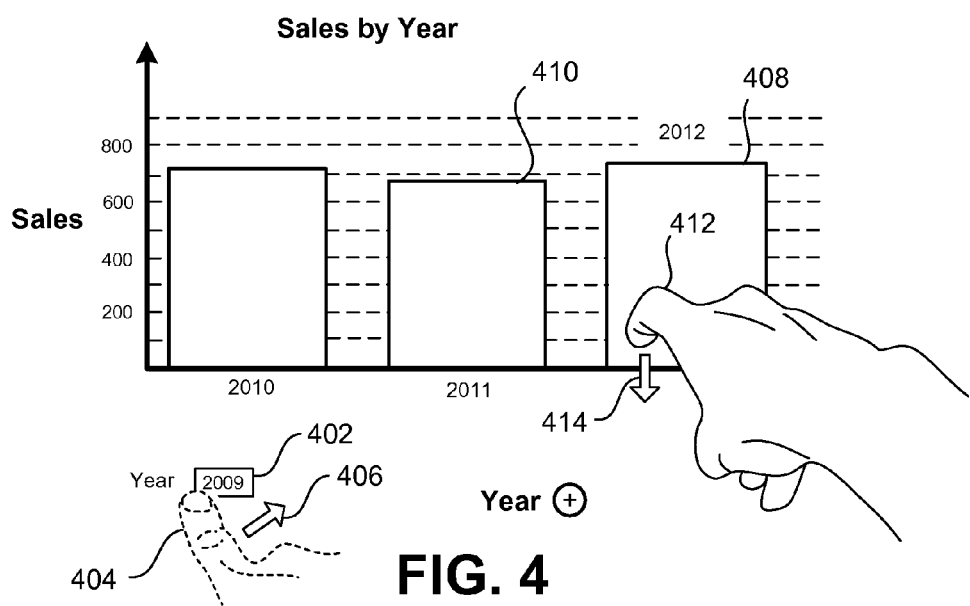

FIG. 4 shows the updated data visualization produced by the filter-out gesture performed in FIG. 3. As indicated there, the filtered-out data visualization now includes just three data items, corresponding to sales volume for the years 2010, 2011, and 2012. Further, the computing device 102 generates and displays a placeholder item 402 beneath the data items (or in any other spatial relationship with respect to the data items). The placeholder item 402 represents the data item for the year 2009, which has been removed via the gesture performed in FIG. 3.

The user can perform a filter-in gesture by touching the placeholder item 402 with his or her finger 404 (or other selection implement) and moving his or her finger 404 in a prescribed manner. For example, the user can touch the placeholder item 402 with his or her finger 404 and flick his or her finger 404 in the direction 406 of the other data items. The computing device 102 interprets this action as a request to restore the removed data item 302 to the bar chart. If the user flicks his or her finger 404 in the downward direction (not shown) on a placeholder item, the computing device 102 can do nothing, or can perform some other action on the selected placeholder item (such as by adding the corresponding removed data item to another data visualization, not shown).

Now assume that the user wishes to remove two other data items (408, 410) corresponding, respectively, to the sales volume for the years 2011 and 2012. The user can perform this operation in the same manner described above, e.g., by touching the data item 408 with his or her finger 412 and then moving his or her finger 412 in a downward direction 414, and then doing the same for the data item 410. This filter-out gesture yields the filtered-out data visualization shown in FIG. 5. As indicated there, the filtered-out data visualization now includes a single data item, corresponding to the year 2010. The user could have produced the same result by flicking in an upward direction on the year 2010 within the data visualization shown in FIG. 3. The updated data visualization now also shows three placeholder items 502, corresponding to the years 2009, 2011, and 2012. Once again, the user can restore any of the removed data items using the above-described type of filter-in gesture.

In the above scenario, the user has selected and removed three data items in successive fashion, one after the other. The user may also restore two or more data items in successive fashion, one after the other. In addition, the user may perform a gesture that has the effect of removing two or more data items at the same time. The user may also perform a gesture that involves restoring two or more data items at the same time. Later figures (to be described below) illustrate these kinds of gestures.

Figure 5:
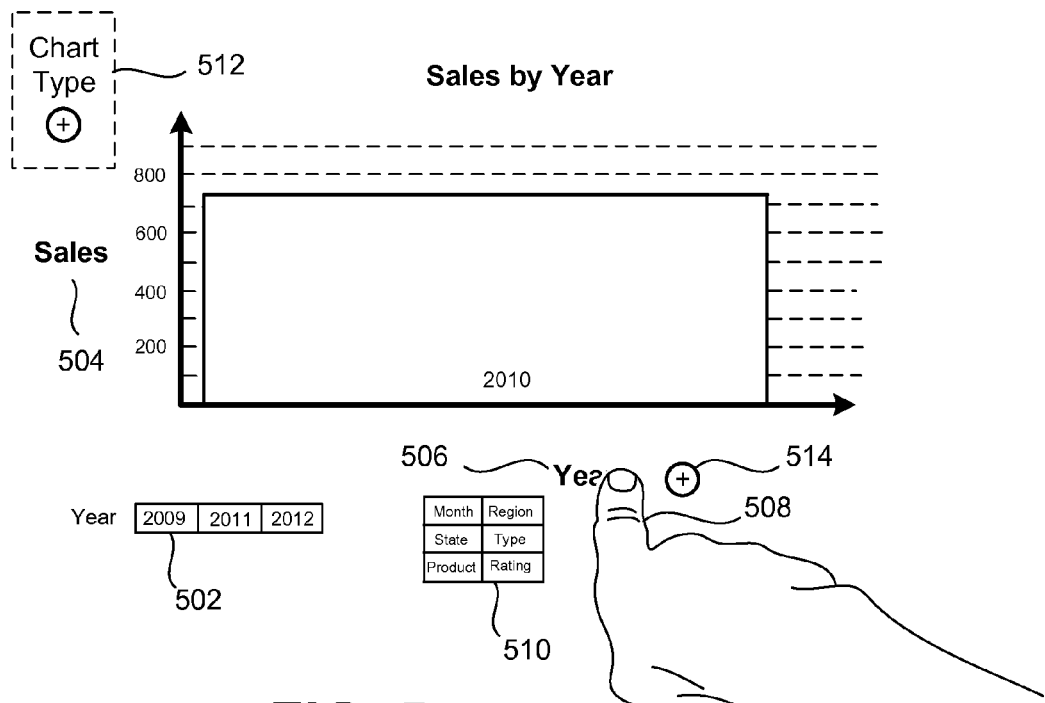
FIGS. 5 and 6 show an illustrative label-interaction gesture, and the computing device's response to that gesture.

Referring to FIG. 5, the data visualization currently assigns a sales-related dimension to the vertical axis (associated with a "Sales" label 504) and a year-related dimension to the horizontal axis (associated with a "Year" label 506). Assume that the user wishes to produce an updated data visualization that shows sales volume by month, not year. This kind of transformation may be regarded as a pivot between two different ways of depicting an underlying data set. To perform this transformation, the user can perform a label-interaction gesture, e.g., by first touching the "Year" label 506 with his or her finger 508 (or other selection implement), or by touching a location near the "Year" label 506. The computing device 102 responds by displaying a label selection panel 510 in proximity to the "Year" label 506. The label selection panel 510 identifies various labels that can be assigned to the horizontal axis, instead of the "Year" label 506.

Figure 6:
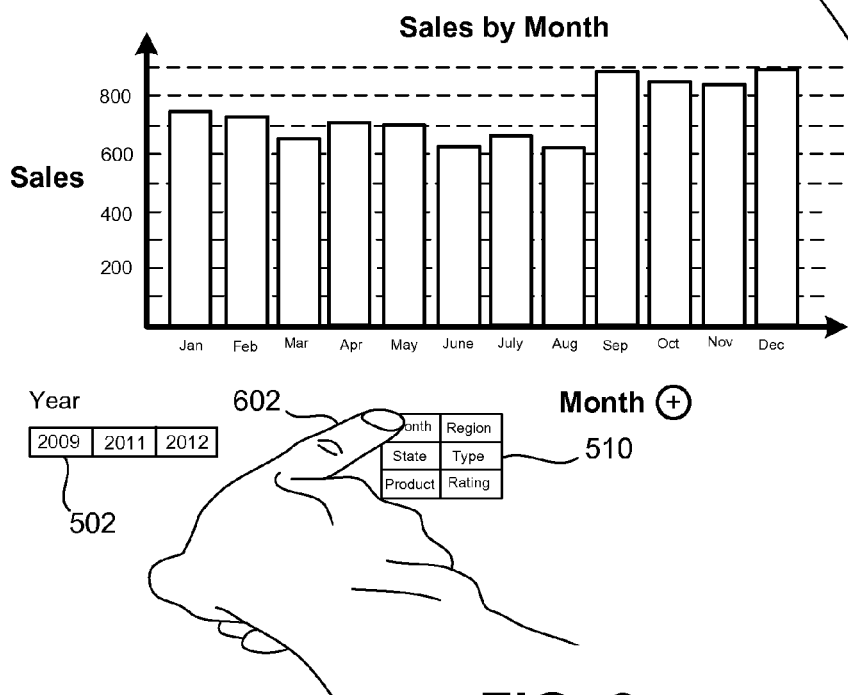

As indicated in FIG. 6, assume that the user next uses his or her finger 602 to touch one of the entries in the label selection panel 510, e.g., corresponding to the "Month" label. The computing device 102 responds by reorganizing the underlying information represented by the data visualization based on the newly selected label. For instance, as shown in FIG. 6, the data visualization now shows data items (e.g., bars) along the horizontal axis corresponding to respective months in the year 2010.

The user can perform a similar label-interaction gesture to change the "Sales" label 504 associated with the vertical axis. For example, the user can touch the "Sales" label 504 (or touch a location near the "Sales" label 504), which prompts the computing device 102 to display a label-selection panel (not shown). The user may then select a new label, such as "Profit," etc. In response, the computing device 102 again reorganizes the information represented by the data visualization based on the newly selected label.

Figure 13:
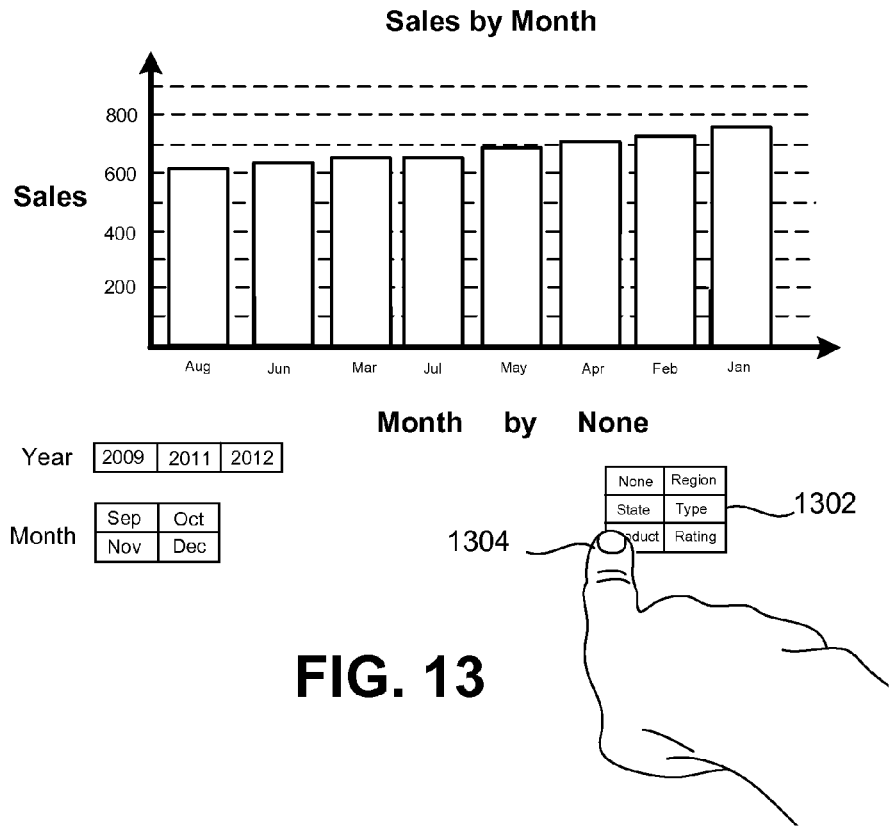
FIGS. 13-15 show illustrative data expansion gestures, and the computing device's response to those gestures.
Figure 14:
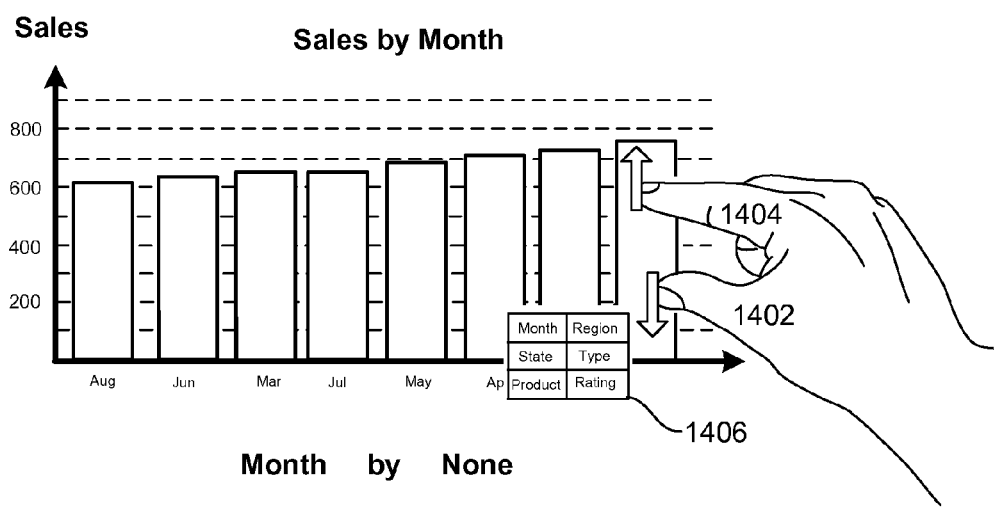
Figure 15:
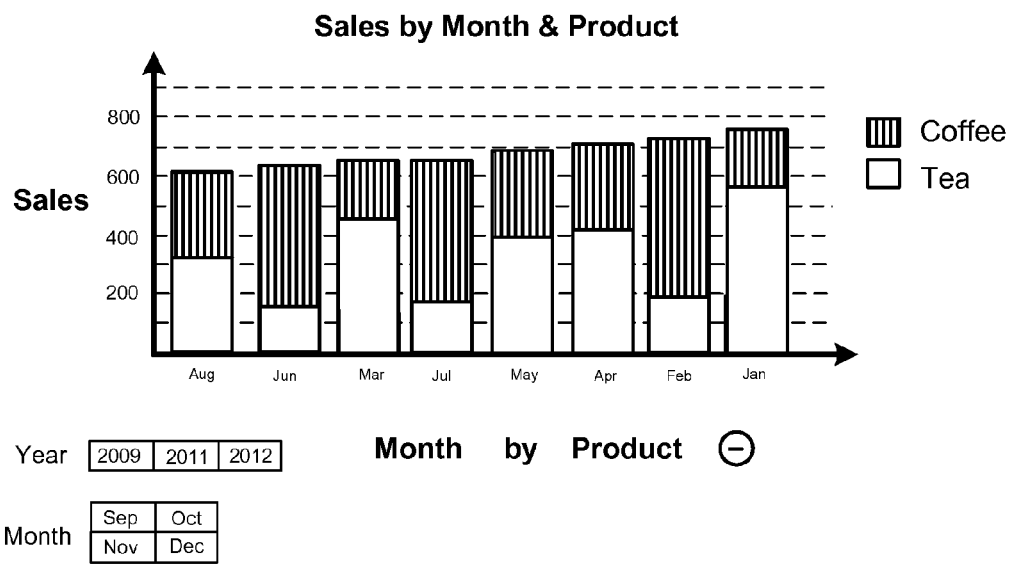

The data visualization may include any number of other labels with which the user may directly interact. For example, the user can touch a "Type" label 512 (or touch near the "Type" label 512) to change the type of the chart associated with the data visualization, e.g., from a bar chart to a pie chart, etc. The user can also activate a data expansion icon 514 to vary the granularity in which data items are presented. FIGS. 13-14, to be described below, provide further information regarding techniques for expanding the granularity of data items.

Figure 7:
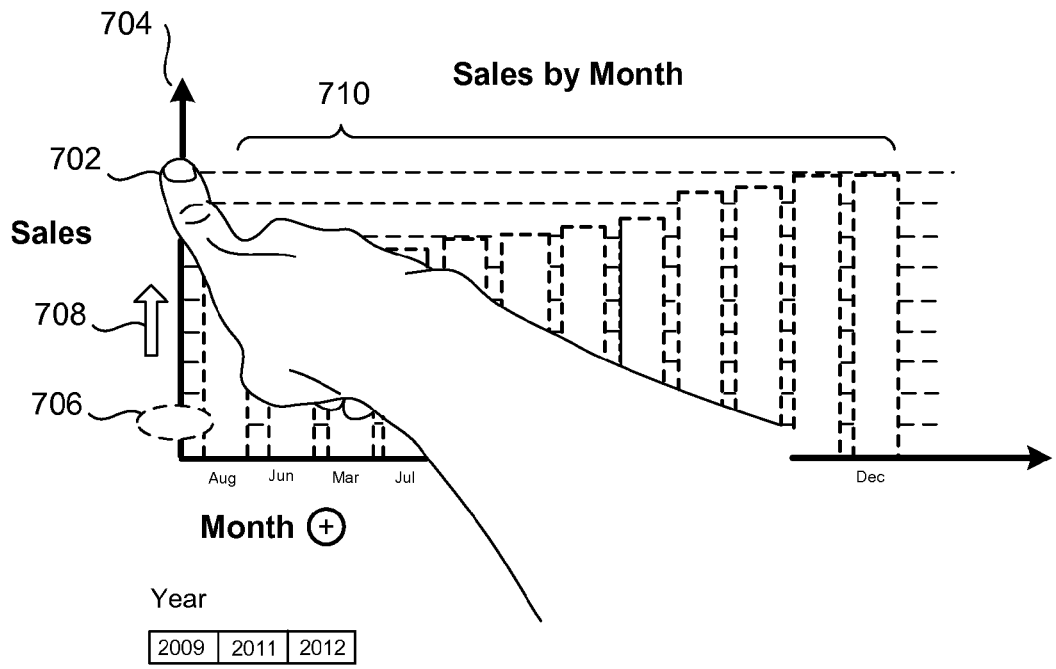
FIGS. 7 and 8 show an illustrative sorting gesture, and the computing device's response to that gesture.

Now advancing to FIG. 7, assume that the user wishes to sort the bars in FIG. 6 in a particular order, such as by ordering the bars in the year 2010 from the month with the lowest sales volume (i.e., August) to the month with the highest sales volume (i.e., December). To perform this task, the user may perform a sorting gesture, e.g., by using his or her finger 702 to touch the vertical axis 704 at an initial location 706, and then moving his or her finger 702 in a generally upward direction 708 along the vertical axis 704. The user may alternatively move his or her finger 702 in the general opposite direction (not shown) to sort months in the order of largest sales volume to smallest sales volume.

More generally stated, the user can perform the sorting gesture by using a selection implement to select a representation of one dimension of the data visualization, such as an axis of the data visualization. The user can then move the selection implement in a first direction to sort the data items in a first manner, or move the selection implement in a second direction to sort the data items in a second manner. The first direction (e.g., from up to down) is approximately opposite to the second direction (e.g., from down to up), and the first manner (from smallest to largest) is opposite to the second manner (e.g., from largest to smallest).

Although not shown, the user can perform a similar sorting operation with respect to the horizontal axis of the data visualization. For example, the user can use his or her finger (or other selection implement) to touch the horizontal axis and then slide his or her finger to the right or to the left. Movement to the right will sort the data items in a first manner (e.g., alphabetically, from A to Z), while movement to the left will sort the data items in a second manner (e.g., from Z to A). Again, the first direction (e.g., from left to right) is approximately opposite to the second direction (e.g., right to left), and the first manner (e.g., from A to Z) is opposite to the second manner (e.g., from Z to A).

Figure 8:
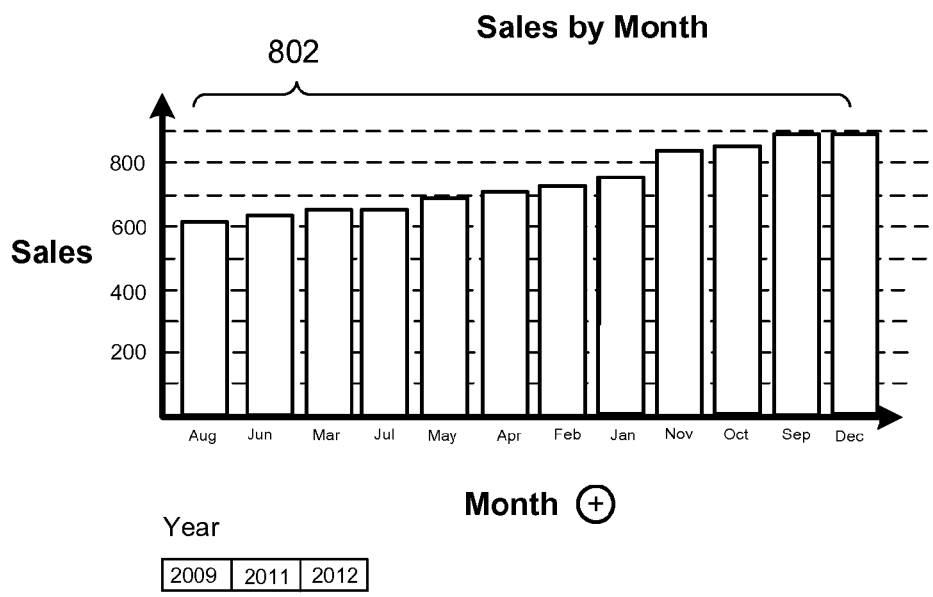

FIGS. 7 and 8 also illustrate a preview feature provided by the computing device 102. For example, in FIG. 7, the computing device 102 displays a preview 710 of the updated data visualization once it detects that a user is in the process of performing the sorting gesture, but has not yet completed the sorting gesture. For example, assume that the user moves his or her finger 702 in the upward direction 708, starting at location 706; thereafter, assume that the user maintains his or her finger 702 in contact with the vertical axis 704. Once the computing device 102 determines that the user is performing a sorting gesture, the computing device 102 will display the preview 710. For example, the computing device 102 can begin to display the preview 710 after the user touches the vertical axis 704 and begins to move a short distance in the upward direction along that axis 704.

FIG. 7 depicts the preview 710 as a series of bars in the updated data visualization, shown in dashed lines, from smallest to largest. In actual practice, the computing device 102 can display the updated data visualization in manner, such as by superimposing a faded-out or semi-transparent version of the updated data visualization over the top of the original data visualization (shown in FIG. 6).

The user can commit to the data visualization shown in the preview 710 by completing the sorting gesture, which may entail removing his or her finger 702 from the vertical axis 704. This operation yields the persisted updated data visualization 802 shown in FIG. 8 (that is, in which the preview 710 is replaced by the finalized data visualization 802). Alternatively, the user can slide his or her finger 702 back in the downward direction along the vertical axis 704 to the initial location 706 (not shown). The computing device 102 responds to this action by restoring the data visualization to its original presentation shown in FIG. 6. Other direct-interaction gestures may exhibit the same kind of preview-related behavior described above; that is, the computing device 102 will display the preview once it determines that the user is performing the direct-interaction gesture, and will replace the preview with a persisted data visualization once the user completes the gesture.

Figure 9:
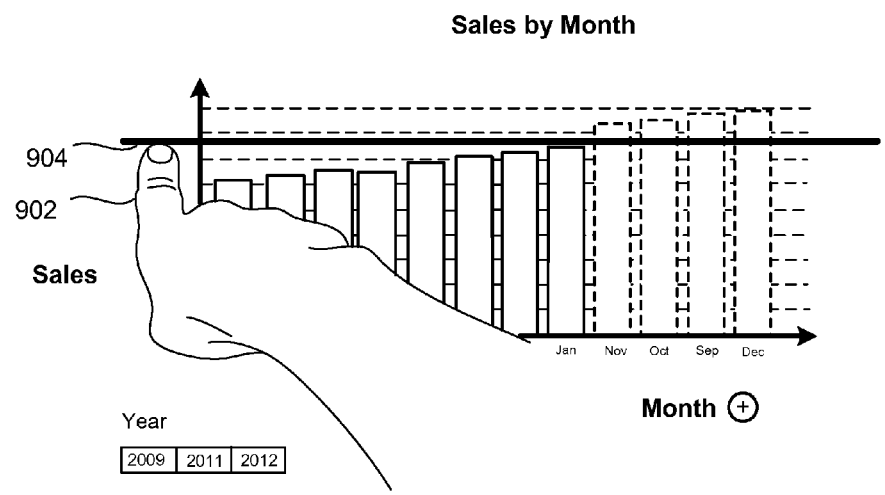
FIGS. 9-12 show additional types of filter-out gestures, and the computing device's response to those gestures.
Figure 10:
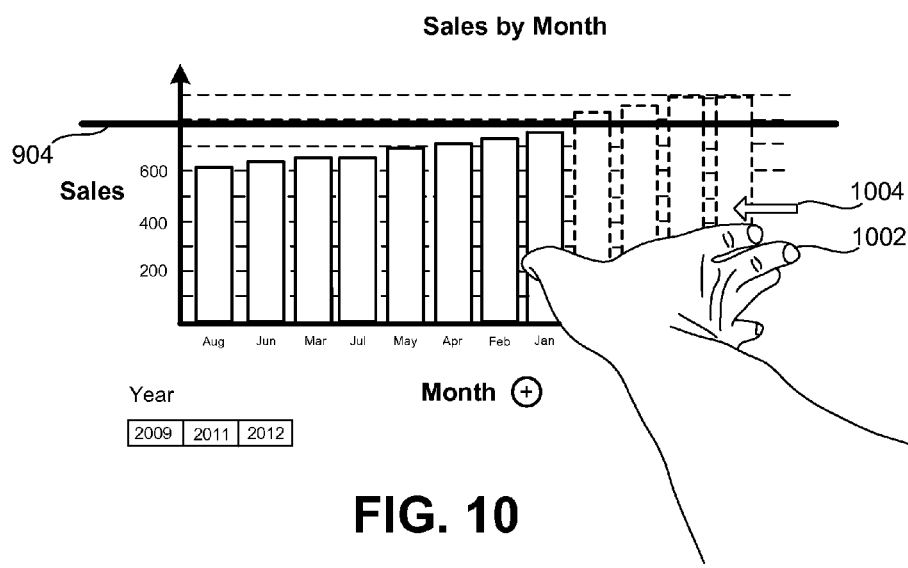

FIGS. 9 and 10 show a filter-out gesture that the user can perform to remove plural data items from the data visualization. In one implementation, the user may use his or her finger 902 (or other selection implement) to touch a sales amount next to the vertical axis of the data visualization. The computing device 102 responds by displaying a horizontal line 904. The user may then optionally drag the horizontal line 904 up or down to designate different sales amounts. The computing device 102 further displays all data items below the line 904 in a first visual format and all data items above the line 904 in a second visual format, e.g., by displaying the data items above the line in a faded-out or semi-transparent form.

Advancing to FIG. 10, the user performs a second phase of the filter-out gesture by using his or her fingertips 1002 to swipe the data visualization in the direction 1004. The computing device 102 responds to this filter-out gesture by removing all of the data items that have sales volumes above the line 904. This operation yields the updated data visualization shown in FIG. 12. Further, the computing device 102 can display placeholder items 1202 corresponding to the months that were filtered out of the data visualization. The computing device 102 can optionally interpret a swipe in the opposite direction (compared to the direction 1004 of the arrow of FIG. 10) as an instruction to filter out the data items having sales volumes below the line 904.

Figure 11:
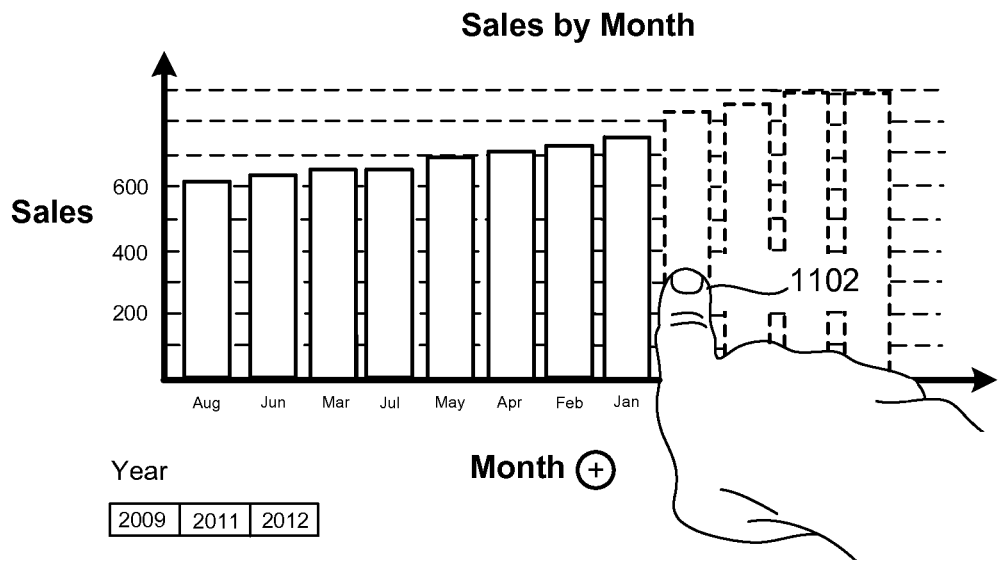
Figure 12:
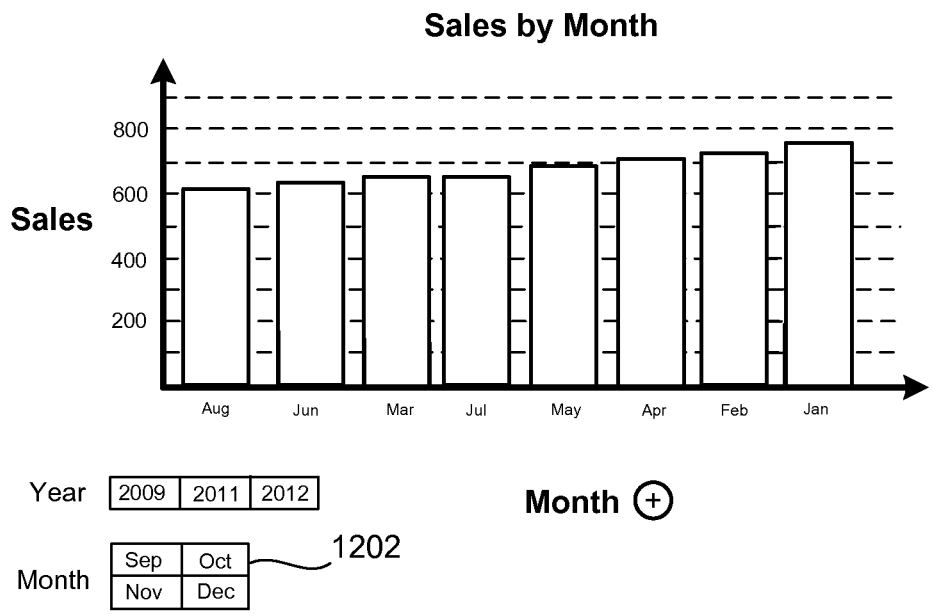

FIG. 11 shows another filter-out gesture by which the user can remove plural data items. Here, the user uses his or her finger 1102 to tap successively on the individual data items to be removed, that is, for months November, October, September, and December. The user may then perform the follow-up phase of the gesture by performing the swiping movement shown in FIG. 10. Or the user may perform another tap in any peripheral region of the user interface presentation, e.g., in any field that is not associated with part of the data visualization. In response, the computing device 102 produces the updated data visualization shown in FIG. 12.

Although not shown, the user can restore plural data items to the data visualization using the same technique shown in FIG. 11. For example, the user can tap on two or more placeholder items and then perform a tap in a peripheral region of the user interface presentation. The computing device 102 responds to this gesture by restoring all of the data items that are associated with the selected placeholder items.

Assume that the user now wishes to change the granularity of the information expressed in the data visualization, e.g., by displaying, for each month, the breakdown of sales volume attributed to different products. The user may perform this task by executing a data expansion gesture. In one implementation, the user can perform this gesture by first touching the icon 514 shown in FIG. 5. The computing device 102 responds by displaying the label selection panel 1302 shown in FIG. 13. Assume that the user then uses his or her finger 1304 to touch the "Product" entry in the label selection panel 1302. The computing device 102 responds to this selection by presenting the updated data visualization shown in FIG. 15. As indicated there, the computing device 102 now partitions each bar into sub-bars; each sub-bar indicates the sales volume associated with a particular type of product (assuming here that there are only two products, corresponding to coffee and tea). Alternatively, the computing device 102 can convey the same information by displaying, for each original bar, two side-by-side bars associated with the two products.

FIG. 14 shows an alternative way that a user may initiate the data expansion gesture. Here, the user touches at least one of the bars using two fingers (1402, 1404). The user then moves his or her fingers (1402, 1404) apart in the direction of the arrows. The computing device 102 interprets this gesture as a request to expand the granularity of the bars, to produce the updated visualization shown in FIG. 15.

Taken all together, the user may perform the collection of gestures shown in FIGS. 3-15 to answer one or more questions. For example, the user may perform these gestures to determine the amount of coffee that was sold in the year 2010 in the eight most profitable months of that year. The user could have answered the same question by manipulating an auxiliary control mechanism, e.g., using drop-down menus or the like. Further, the user could have possibly answered this question with fewer actions by using the auxiliary control mechanism, compared to the use of direct-interaction gestures. Nevertheless, the user may prefer to use the direct interaction gestures because he or she may perceive it as offering a more satisfactory user experience.

In conclusion, FIGS. 3-15 where framed in the context of concrete representative gestures associated with particular data manipulation tasks. Other implementations can vary any aspect of these gestures. For example, any gesture can be modified by changing the part of the data visualization that a user is expected to touch to initiate the gesture. For example, in the above examples, the user was expected to directly touch a selected data item, axis, label, etc. But the user can alternatively, or in addition, initiate the gestures in response to touching regions in proximity to the selected data item, axis, label, etc. (which is still considered direct interaction, as that term is used herein). Alternatively, or in addition, the gestures can be modified by changing the movements that are associated with the gestures, compared to the illustrative movements described above. Alternatively, or in addition, the gestures can be modified by changing the behaviors that are associated with the gestures, compared to the illustrative behaviors described above. The gestures can be modified in yet other ways.

Further, the computing device 102 can invoke the preview feature in a different manner compared to the example described above in connection with FIGS. 7 and 8. In that example, the computing device 102 displays the preview so long as the user maintains his or her finger in contact with the display surface of the computing device 102. In another implementation, the computing device 102 can show a preview for a prescribed amount of time before persisting the updated data visualization, regardless of whether the user's finger is still in contact with the display surface. Alternatively, or in addition, the computing device 102 can present an inquiry to the user when it displays the updated data visualization, e.g., asking the user, "Do you want to change the data visualization in this way?", or the like. Alternatively, or in addition, the computing device 102 can provide an "undo" control feature that allows the user to remove the updated data visualization.

Further, the above figures depicted gestures that involve making actual or close physical contact with a touch-sensitive surface of the computing device 102, e.g., using a finger or other selection implement. But the computing device 102 can also detect commands that involve other types of behavior, besides, or in addition to, touch-related behavior. For example, the computing device 102 can detect commands that involve movement of the computing device 102, movement of the user in free space (without necessarily making contact with the computing device 102), movement of a mouse device, spoken information, and so on.

Figure 16:
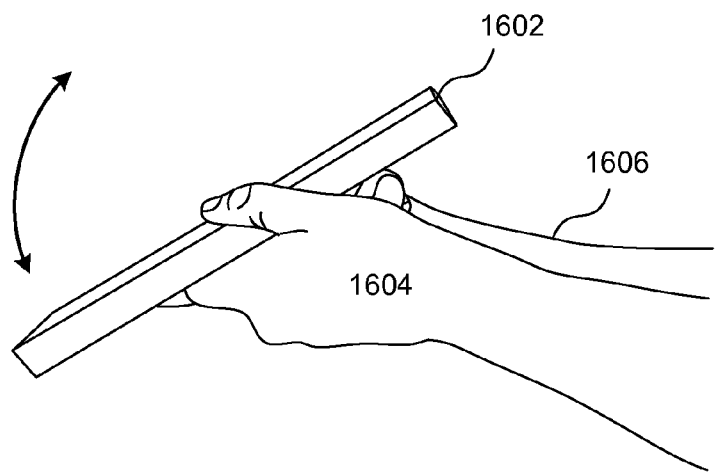
FIG. 16 shows a gesture that involves moving the computing device.

For example, FIG. 16 shows a gesture that involves grasping a tablet-type computing device 1602 with one or more hands (1604, 1606) and tilting the computing device 1602 about an axis that runs through the hands (1604, 1606), e.g., by tilting the computing device 1602 either towards the user, or away from the user. Or the user can tilt the computing device 1602 by lifting her right hand 1606 relative to the left hand 1604, or vice versa. In one implementation, the computing device 1602 can interpret any one of these movements as a request to sort the data items shown in FIG. 6 to produce the sorted data visualization shown in FIG. 8. Metaphorically, the data items can be viewed as having a mass which depends on their respective sales volumes. When the user tilts the computing device 1602, the computing device 1602 can reorder the data items in order of their metaphorical weights, e.g., from lightest to heaviest or from heaviest to lightest. This movement-related gesture is, again, merely presented by way of example, not limitation. Other gestures can involve shaking the computing device 1602, flicking the computing device 1602, rotating the computing device 1602 within a plane, striking parts of the data visualization with varying degrees of force, and so on. Other gestures can involve particular combinations in which the user touches the computing device 1602 in a prescribed manner, while simultaneously (or successively) moving it in a prescribed manner.

B. Illustrative Processes

FIGS. 17-20 show procedures that explain one manner of operation of the computing device 102 of FIG. 1. Since the principles underlying the operation of the computing device 102 have already been described in Section A, certain operations will be addressed in summary fashion in this section.

Figure 17:
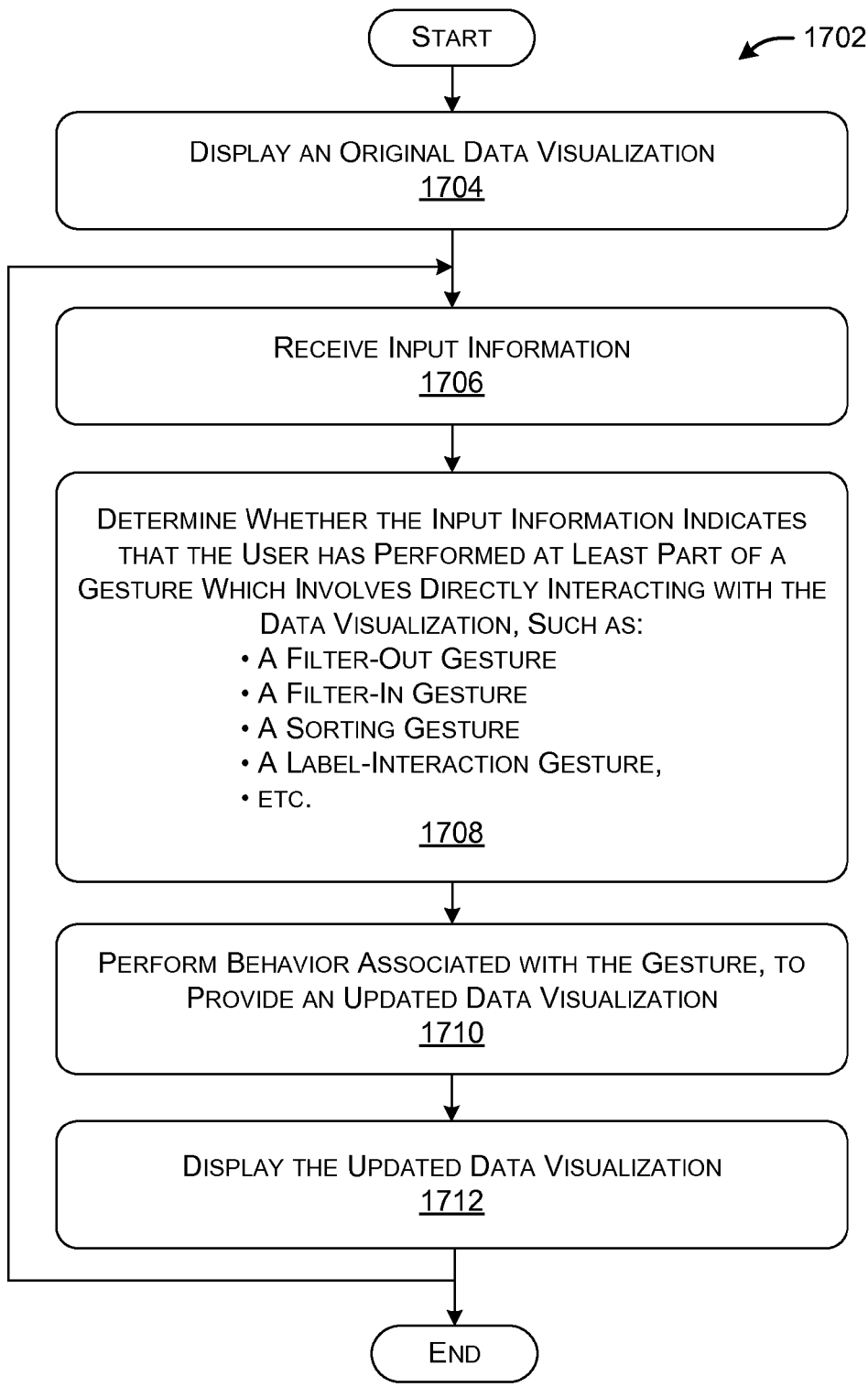
FIG. 17 is a flowchart that provides an overview of one manner of operation of the computing device of FIG. 1.

Starting with FIG. 17, this figure shows a procedure 1702 that represents an overview of one manner of operation of the computing device 102. In block 1704, the computing device 102 displays an original data visualization. In block 1706, the computing device 102 receives input information from one or more of the input mechanisms 106. For example, the input information may indicate that the user has touched a touch-sensitive display surface of the computing device 102, and/or moved the computing device 102, etc. In block 1708, the computing device 102 determines whether the input information indicates that that the user has performed at least part of a direct-interaction gesture which involves directly interacting with a part of the data visualization. Illustrative gestures described above include filter-out gestures, filter-in gestures, sorting gestures, label-interaction gestures (e.g., corresponding to information-pivoting gestures), data expansion gestures, and so on. In block 1710, the computing device 102 performs the behavior associated with the detected gesture. In block 1712, the computing device 102 provides an updated data visualization which reflects the outcome of the behavior performed in block 1710.

Figure 18:
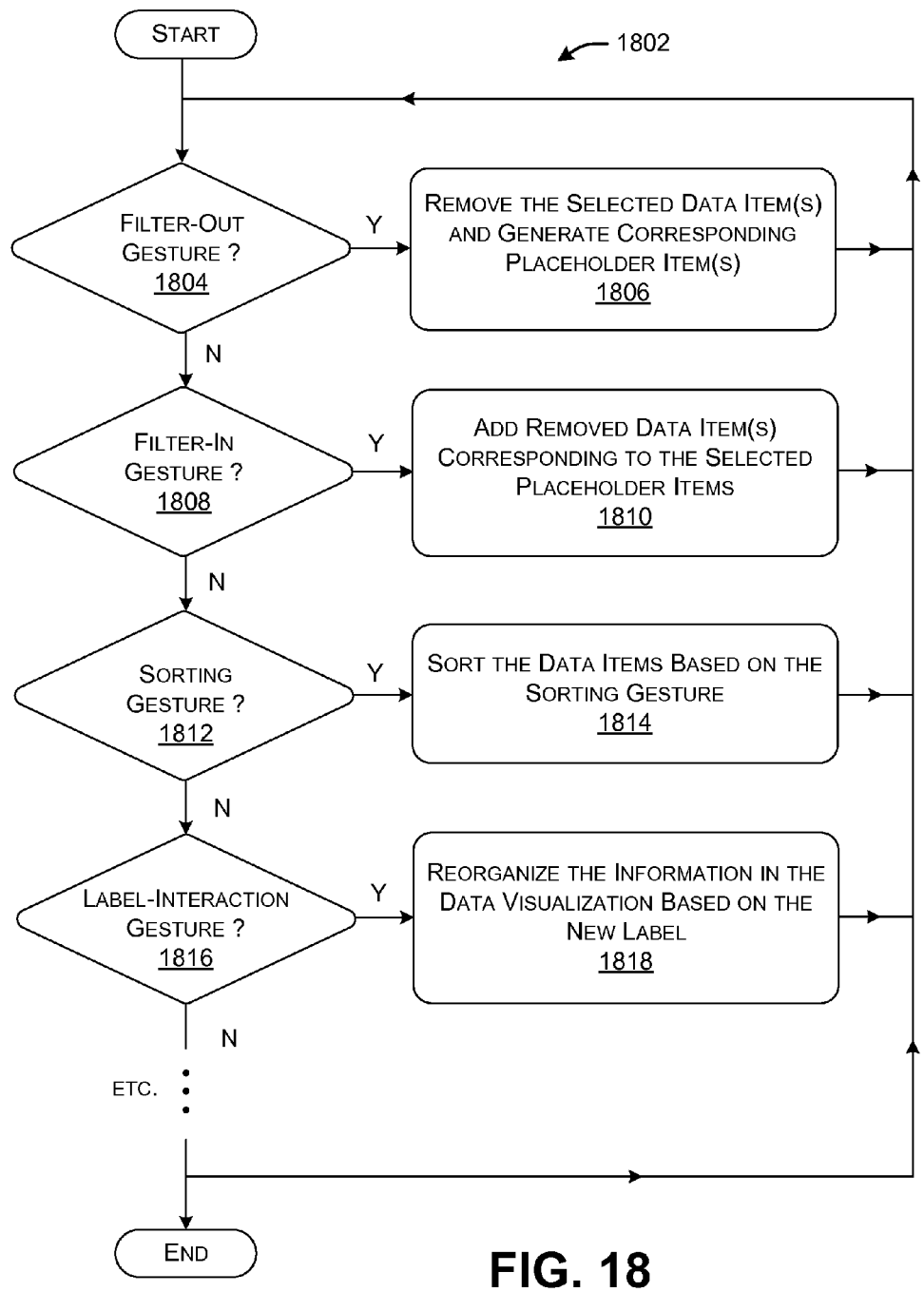
FIG. 18 is a flowchart that describes one illustrative manner by which the computing device (of FIG. 1) can handle different types of gestures.

FIG. 18 shows a procedure 1802 that provides further details regarding one way in which the computing device 102 may handle different types of gestures. In block 1804, the computing device 102 determines whether a user has performed a filter-out gesture. The user can perform this gesture by directly interacting with at least one selected data item. For example, the user can perform a filter-out gesture by selecting at least one data item with a selection implement (e.g., a finger), and then moving the selection implement in a prescribed manner. If this kind of gesture has been performed, then, in block 1806, the computing device 102 removes at least one to-be-removed data item from the original data presentation, to provide a filtered-out data visualization. The computing device 102 can also generate a placeholder item associated with each data item that has been filtered out.

For example, assume that the user selects a data item and moves the selection implement in a first manner (e.g., by flicking his or her finger in the downward direction). In this case, the to-be-removed data item corresponds to the selected data item. In another case, assume that the user selects a data item and moves the selection item in a second manner (e.g., by flicking his or her finger in the upward direction). In this case, the to-be-removed data items correspond to other data items in the original data visualization besides the selected data item.

In block 1808, the computing device 102 determines whether a user has performed a filter-in gesture. The user can perform this gesture, for example, by selecting one or more placeholder data items with a selection implement (e.g., a finger), and then moving the selection implement in a prescribed manner. Each placeholder data item corresponds to a removed data item that has been previously removed. If this kind of gesture has been performed, then, in block 1810, the computing device 102 produces a filtered-in data presentation by adding the removed data item(s) to the original data presentation.

In block 1812, the computing device 102 determines whether a user has performed a sorting gesture. The user can perform this gesture, for example, by selecting an axis with a selection implement (e.g., a finger) and then moving the selection implement in a prescribed manner. If this kind of gesture has been performed, then, in block 1814, the computing device 102 sorts the data items based on the sorting gesture, to provide a sorted data visualization.

For example, assume that the user uses the selection implement to touch an axis (or to touch a region in proximity to the axis), and then moves the selection implement in either a first or second direction. If the user moves the selection implement in a first direction, the computing device 102 may sort the data items in a first manner. If the user moves the selection implement in a second direction, the computing device 102 may sort the data items in a second manner. In one case, the first direction is approximately opposite to the second direction, and the first manner is opposite to the second manner. For example, the first direction may correspond to a generally upward direction along the axis, while the second direction may correspond to a generally downward direction along the axis. The first manner may involve ordering the data items in one order (e.g., from smallest to largest) and the second manner may involve ordering the data items in the opposite order (e.g., from largest to smallest).

In block 1816, the computing device 102 determines whether a user has performed a label-interaction gesture. The user can perform this gesture, for example, by selecting a label of the data visualization (e.g., by touching the label or touching a region in proximity to the label), which prompts the computing device 102 to display a label-selection panel. The user may then select an entry within that panel. If this kind of gesture has been performed, then, in block 1518, the computing device 102 pivots the information expressed in the original data visualization based on the new label that has been selected. This operation yields a sorted data visualization.

The above four gestures are cited by way of example, not limitation. Other implementations can accommodate additional gestures for directly interacting with the data visualization, such as the data expansion gestures shown in FIGS. 13-15. Alternatively, or in addition, other data visualizations can omit one or more of the above-described gestures.

Figure 19:
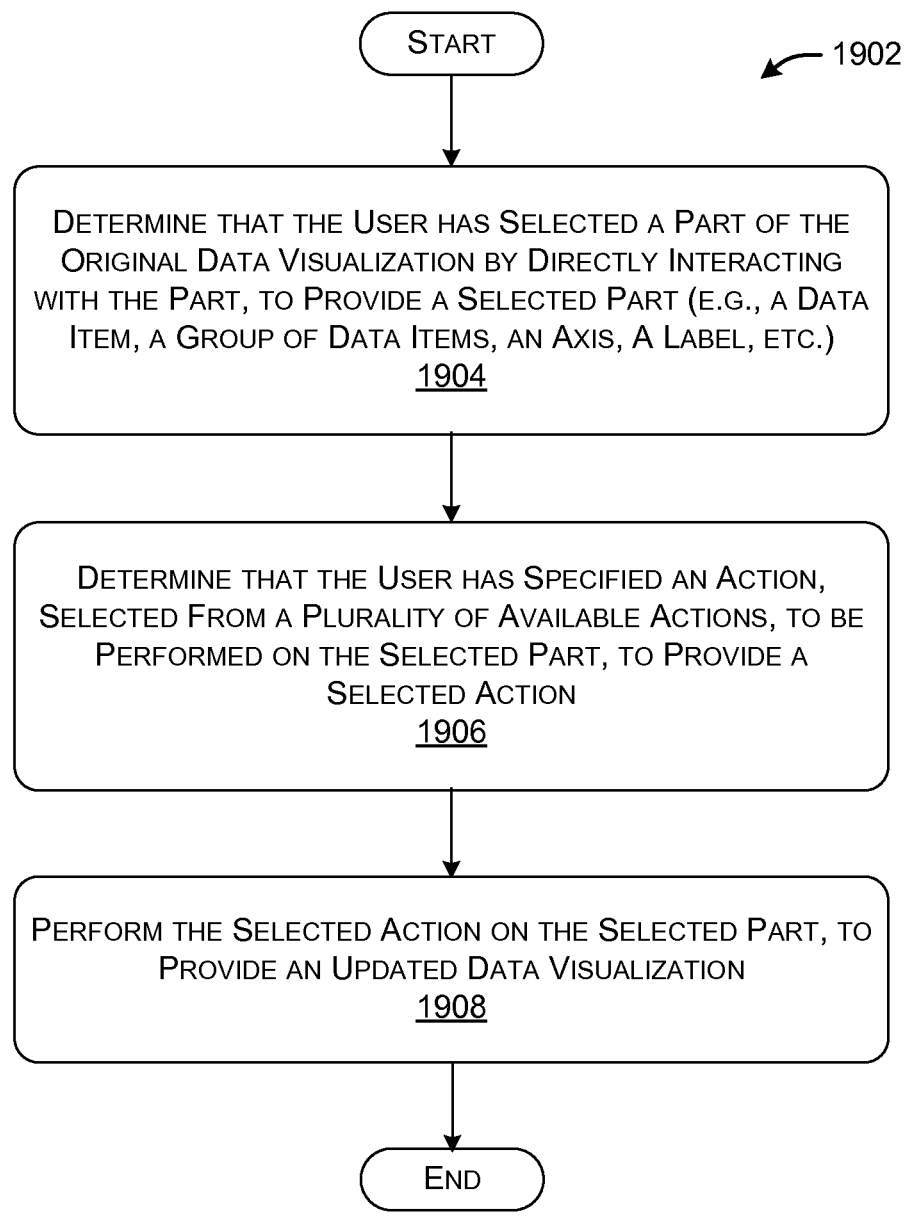
FIG. 19 is a flowchart which summarizes the processing of many types of direction-interaction gestures.

FIG. 19 shows a procedure 1902 which summarizes the processing of many types of direction-interaction gestures. In block 1904, the computing device 102 determines whether the user has selected a part of the original data visualization, such as a data item, a group of data items, an axis, a label, etc. This selection operation provides a selected part. In block 1906, the computing device 102 determines whether the user has specified an action, selected from among a plurality of available actions, to be performed on the selected part. For example, in a filter-out gesture, the user can specify an action by flicking up or down on one or more selected data items. In a sorting gesture, the user can specify an action by flicking up or down on a selected axis. In a label-interaction gesture, the user can specify an action by selecting a new label within the label selection panel. In block 1908, the computing device 102 performs the selected action on the selected part. For example, in a filter-out action, the computing device 102 can remove the selected data item from the original data presentation, and display a placeholder beneath the updated data items.

Figure 20:
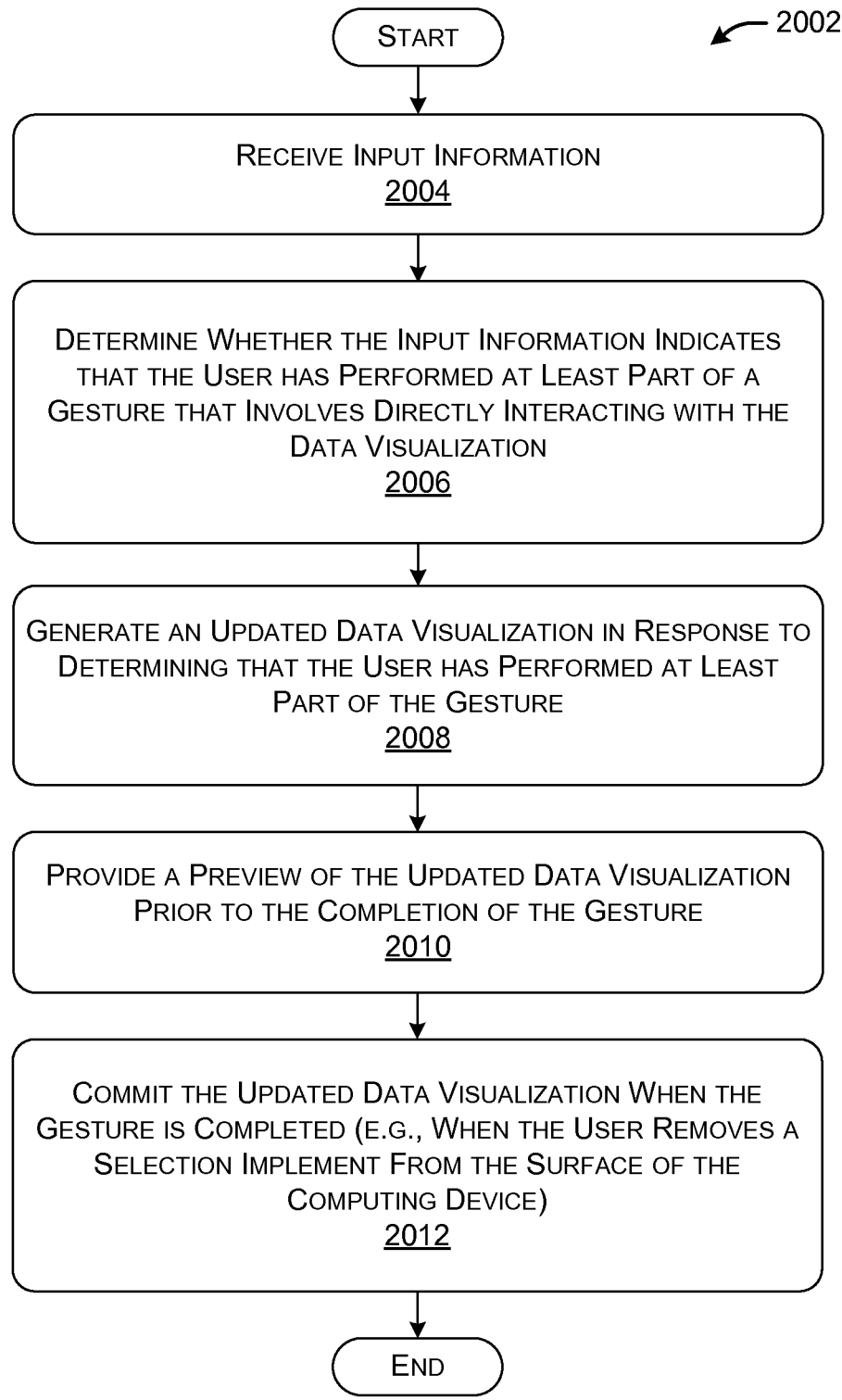
FIG. 20 is a flowchart that explains one manner by which the computing device can provide a preview of an updated data visualization, prior to finalizing (e.g., committing to) the updated data visualization.

Finally, FIG. 20 shows a procedure 2002 that describes one manner by which the computing device 102 can provide a preview of its data manipulation results. In block 2004, the computing device 102 receives input information from the input mechanisms 106. In block 2006, the computing device 102 determines whether the input information indicates that the user has performed at least part of a gesture that involves directly interacting with an original data visualization. In block 2008, the computing device 102 generates an updated data visualization in response to determining that the user is performing the gesture. In block 2010, the computing device 102 provides a preview of the updated data visualization prior to the completion of the gesture. In block 2012, the computing device 102 commits (e.g., finalizes) the updated data visualization when the gesture is completed. For example, as shown in FIG. 7, the computing device 102 can provide a preview 710 when it detects that the user is in the process of performing the sorting gesture. As shown in FIG. 8, the computing device 102 can commit (e.g., finalize) the sorting operation when the user removes his or her finger 702 from the vertical axis 704, and thereby completes the sorting gesture.

C. Representative Computing Functionality

FIG. 21 illustrates computing functionality 2100 that can be used to implement any aspect of the functions described above. For example, the type of computing functionality 2100 shown in FIG. 21 can be used to implement any aspect of the computing device 102 of FIG. 1. However implemented, the computing functionality 2300 represents one or more physical and tangible processing mechanisms.

The computing functionality 2100 can include volatile and non-volatile memory, such as RAM 2102 and ROM 2104, as well as one or more processing devices 2106 (e.g., one or more CPUs, and/or one or more GPUs, etc.). The computing functionality 2100 also optionally includes various media devices 2108, such as a hard disk module, an optical disk module, and so forth. The computing functionality 2100 can perform various operations identified above when the processing device(s) 2106 executes instructions that are maintained by memory (e.g., RAM 2102, ROM 2104, or elsewhere).

More generally, instructions and other information can be stored on any computer readable medium 2110, including, but not limited to, static memory storage devices, magnetic storage devices, optical storage devices, and so on. The term computer readable medium also encompasses plural storage devices. In many cases, the computer readable medium 2110 represents some form of physical and tangible entity. The term computer readable medium also encompasses propagated signals, e.g., transmitted or received via physical conduit and/or air or other wireless medium, etc. The specific terms "computer readable storage medium" and "computer readable medium device," however, expressly exclude propagated signals per se, while including all other forms of computer readable media.

The computing functionality 2100 also includes an input/output module 2112 for receiving various inputs (via input devices 2114), and for providing various outputs (via output devices). Illustrative input devices include a keyboard device, a mouse input device, a touchscreen input device, a digitizing pad, one or more cameras, a voice recognition mechanism, any movement detection mechanisms (e.g., an accelerometer, gyroscope, etc.), and so on. One particular output mechanism may include a presentation device 2116 and an associated graphical user interface (GUI) 2118. The computing functionality 2100 can also include one or more network interfaces 2120 for exchanging data with other devices via one or more communication conduits 2122. One or more communication buses 2124 communicatively couple the above-described components together.

The communication conduit(s) 2122 can be implemented in any manner, e.g., by a local area network, a wide area network (e.g., the Internet), etc., or any combination thereof. The communication conduit(s) 2122 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
a touch screen configured to provide input information in response to interaction by a user with the computing device;
a processing device; and
a computer readable storage medium storing computer readable instructions that, when executed by the processing device, cause the processing device to:
display a bar chart comprising bars;
receive the input information;
in a first instance:
determine that the input information indicates that the user has performed a flick filter-out gesture comprising touching an individual bar of the bar chart with a finger and performing a downward flicking movement on the individual bar,
responsive to determining that the user has performed the flick filter-out gesture, remove the individual bar from the bar chart, and
display an updated bar chart without the individual bar, the updated bar chart comprising a different individual bar that was not selected by the flick filter-out gesture; and
in a second instance:
determine that the input information indicates that the user has performed a flick up filter-out gesture comprising touching another individual bar of the bar chart with the finger and performing an upward flicking movement on the another individual bar, and
responsive to determining that the user has performed the flick up filter-out gesture on the another individual bar, remove remaining bars of the bar chart and retain the another individual bar in another updated bar chart.

2. The computing device of claim 1, wherein the computer readable instructions further cause the processing device to:
in the first instance, detect completion of the flick filter-out gesture; and
responsive to detecting the completion of the flick filter-out gesture, display the updated bar chart.

3. The computing device of claim 2, wherein the completion of the flick filter-out gesture comprises the user releasing touch contact with the touch screen.

4. The computing device of claim 1, wherein the computer readable instructions further cause the processing device to:
determine that the user has performed the flick filter-out gesture in part by matching the input information to a signature in a collection of signatures that associates the signature with the flick filter-out gesture.

5. The computing device of claim 1, wherein, in the first instance, the input information indicates that the user has touched additional individual bars of the bar chart, and the computer readable instructions further cause the processing device to:
responsive to determining that the user has performed the flick filter-out gesture, remove the individual bar and the additional individual bars from the bar chart.

6. The computing device of claim 1, wherein the computer readable instructions further cause the processing device to:
determine that the user has performed a different gesture comprising another flicking movement on another individual bar in a different direction; and
responsive to determining that the user has performed the different gesture, complete a different action relative to the another individual bar as indicated by the different gesture.

7. A method performed by a computing device, the method comprising:
receiving input information reflecting interaction of a user with bars of a bar chart on a touch screen;
in a first instance:
determining that the input information indicates that the user has performed a flick filter-out gesture comprising touching an individual bar of the bar chart with a finger and performing a flicking movement on the individual bar in a particular direction, responsive to determining that the user has performed the flick filter-out gesture, removing the individual bar from the bar chart, and displaying an updated bar chart without the individual bar, the updated bar chart comprising a different individual bar that was not selected by the flick filter-out gesture; and in a second instance:

determining that the input information indicates that the user has performed a different flick filter-out gesture comprising touching another individual bar of the bar chart with the finger and performing another flicking movement on the another individual bar in a different direction, and responsive to determining that the user has performed the different flick filter-out gesture on the another individual bar, removing remaining bars of the bar chart and retaining the another individual bar in another updated bar chart.

8. The method of claim 7, wherein the determining that the input information indicates that the individual bar of the bar chart has been touched comprises a selecting phase of the flick filter-out gesture, the selecting phase identifying the individual bar.

9. The method of claim 8, wherein the determining that the input information indicates that the user has performed the flicking movement on the individual bar in the particular direction comprises a flicking phase of the flick filter-out gesture, the flicking phase specifying removal of the individual bar from the bar chart.

10. The method of claim 9, wherein, in the first instance, the selecting phase comprises selecting multiple individual bars and the method further comprises:

in response to detecting the selecting phase and the flicking phase, updating the bar chart by removing the multiple individual bars.

11. The method of claim 7, wherein the individual bar corresponds to a single measurement displayed in the bar chart.

12. The method of claim 7, further comprising:

generating a placeholder item for the individual bar; and after the removal of the individual bar, displaying the placeholder item and the updated bar chart.

13. The method of claim 12, further comprising:

detecting a filter-in gesture performed by the user relative to the placeholder item; and in response to detecting the filter-in gesture, restoring the placeholder item to the updated bar chart.

14. The method of claim 13, wherein the filter-in gesture comprises a new touch-related flicking movement on the placeholder item in a direction toward the updated bar chart.

15. The method of claim 13, wherein the filter-in gesture comprises selecting the placeholder item and tapping a peripheral region of the touch screen.

16. The method of claim 12, further comprising:

detecting an additional gesture performed by the user relative to the placeholder item; and in response to detecting the additional gesture, adding the placeholder item to a different data visualization.

17. The method of claim 7, wherein the particular direction is opposite the different direction.

18. A computing device, comprising:

a touch screen configured to provide input information in response to interaction by a user with the computing device;

a processing device; and a computer readable storage medium storing computer readable instructions that, when executed by the processing device, cause the processing device to:

display a bar chart comprising bars;

receive the input information;

in a first instance:

determine that the input information indicates that the user has performed a flick filter-out gesture comprising touching an individual bar of the bar chart and performing a flicking movement on the individual bar in a first direction, responsive to determining that the user has performed the flick filter-out gesture, remove the individual bar from the bar chart, and display an updated bar chart without the individual bar, the updated bar chart comprising a different individual bar that was not selected by the flick filter-out gesture; and in a second instance:

determine that the input information indicates that the user has performed a different flick filter-out gesture comprising touching another individual bar of the bar chart and performing another flicking movement on the another individual bar in a second direction, and responsive to determining that the user has performed the different flick filter-out gesture on the another individual bar, remove remaining bars of the bar chart and retain the another individual bar in another updated bar chart.

19. The computing device of claim 18, wherein the computer readable instructions further cause the processing device to:

in the first instance, generate a placeholder item for the individual bar; and display the placeholder item and the updated bar chart.

20. The computing device of claim 19, wherein the computer readable instructions further cause the processing device to:

receive additional input information;

determine whether the additional input information indicates that the user has performed an additional gesture on the placeholder item; and responsive to determining that the user has performed the additional gesture, restore the placeholder item to the updated bar chart.

* * * * *